United States Patent
Moroo

(10) Patent No.: US 7,010,178 B2
(45) Date of Patent: Mar. 7, 2006

(54) IMAGE PROCESSING APPARATUS, IMAGE PROCESSING METHOD AND COMPUTER-READABLE MEDIUM ON WHICH IMAGE PROCESSING PROGRAM IS RECORDED

(75) Inventor: Jun Moroo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 542 days.

(21) Appl. No.: 10/093,821

(22) Filed: Mar. 11, 2002

(65) Prior Publication Data

US 2002/0136469 A1 Sep. 26, 2002

(30) Foreign Application Priority Data

Mar. 23, 2001 (JP) ............................. 2001-084335
Oct. 18, 2001 (JP) ............................. 2001-320620

(51) Int. Cl.
G06K 9/22 (2006.01)
(52) U.S. Cl. ..................................... 382/313
(58) Field of Classification Search ................. 358/1.1, 358/473, 504; 348/99, 95, 125, 129, 130; 235/454, 426.11, 426.09, 470; 382/317–319, 382/321, 313, 312, 296, 295, 294, 289, 286, 382/280, 151, 141, 112, 100
See application file for complete search history.

(56) References Cited

U.S. PATENT DOCUMENTS

| | | | | |
|---|---|---|---|---|
| 4,897,880 A | * | 1/1990 | Wilber et al. | 382/177 |
| 5,155,343 A | * | 10/1992 | Chandler et al. | 235/462.09 |
| 5,296,690 A | * | 3/1994 | Chandler et al. | 235/462.1 |
| 5,355,146 A | * | 10/1994 | Chiu et al. | 345/156 |
| 5,850,486 A | * | 12/1998 | Maas et al. | 382/294 |
| 6,625,331 B1 | * | 9/2003 | Imaizumi et al. | 382/294 |

FOREIGN PATENT DOCUMENTS

JP HEI 11-341259 12/1999

* cited by examiner

Primary Examiner—Jose L. Couso
(74) Attorney, Agent, or Firm—Staas & Halsey LLP

(57) ABSTRACT

The invention provides an image processing apparatus which can correct distortion of read image data using only the image data without using a two-dimensional sensor. The image processing apparatus includes an estimation section for estimating a displacement amount between part data which form image data based on a cross-correlation between the part data, and a correction section for correcting the image data so as to cancel a displacement in the image data based on the displacement amount estimated by the estimation section. The image processing apparatus is used to correct distortion of an image, particularly a document image, inputted from an image inputting apparatus such as, for example, a handheld image scanner.

46 Claims, 24 Drawing Sheets

DISPLACEMENT AMOUNT ESTIMATION RESULT

SMOOTHING PROCESS RESULT

R1: LEFT SIDE DISPLACEMENT
AMOUNT ESTIMATION RESULT

R2: RIGHT SIDE DISPLACEMENT
AMOUNT ESTIMATION RESULT

RERATED ART

F I G. 2 3
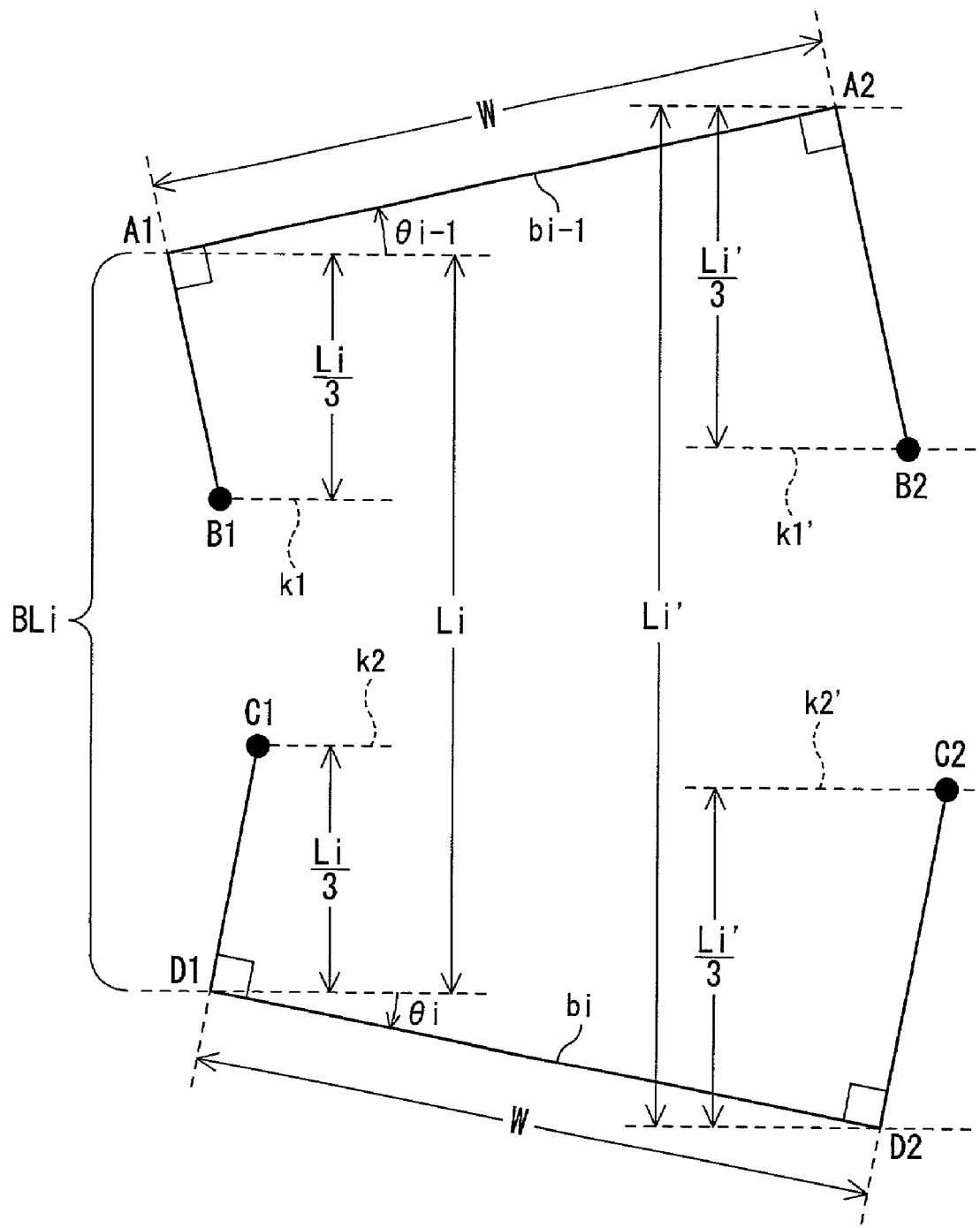

F I G. 24
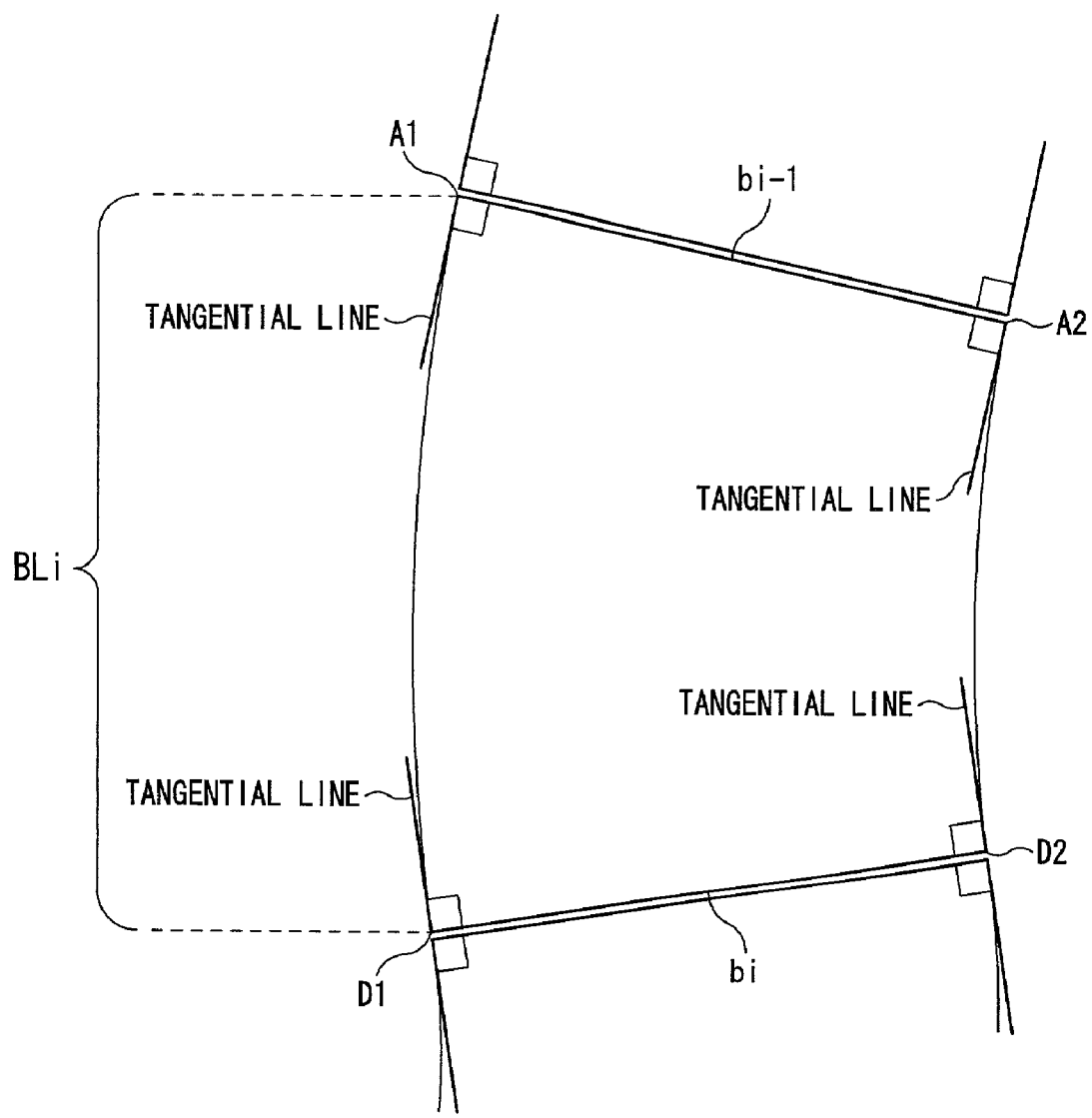

F I G. 2 7
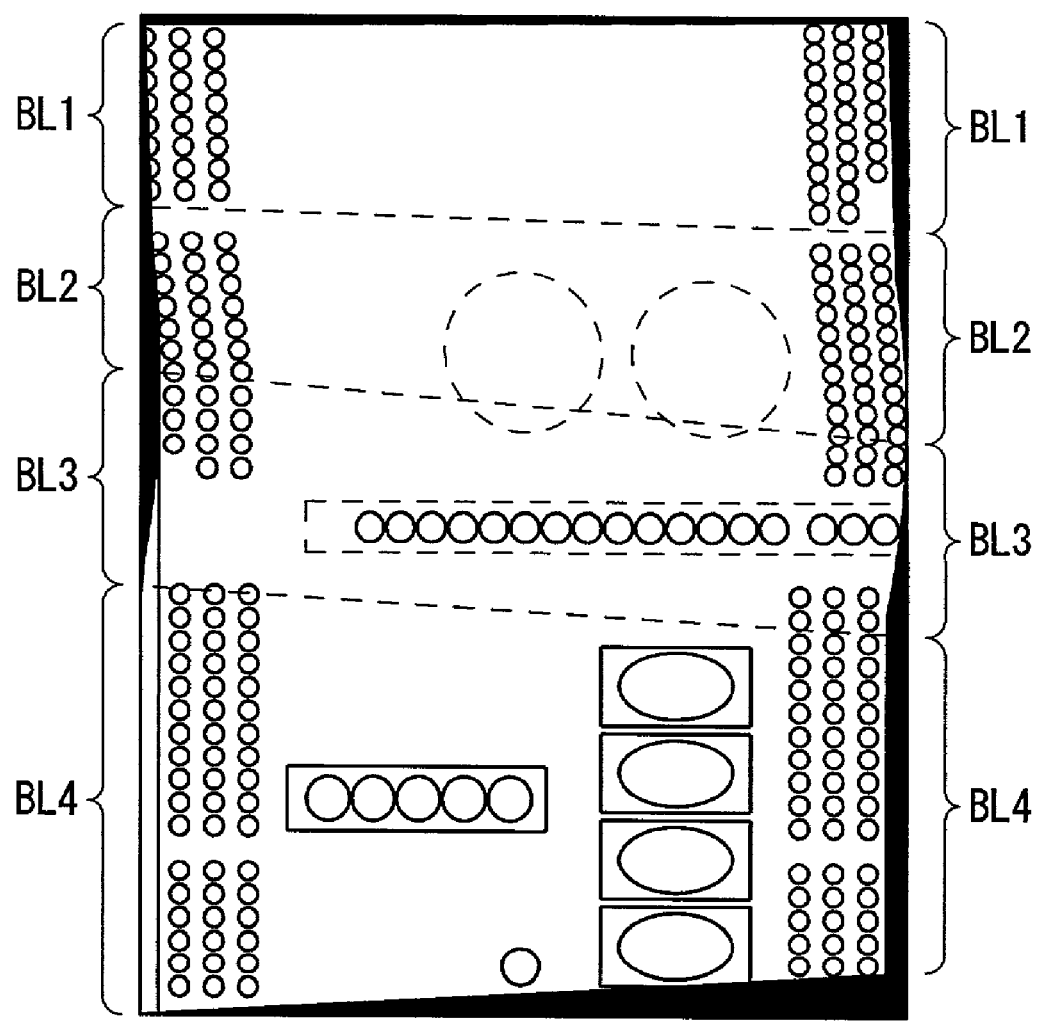

IMAGE PROCESSING APPARATUS, IMAGE PROCESSING METHOD AND COMPUTER-READABLE MEDIUM ON WHICH IMAGE PROCESSING PROGRAM IS RECORDED

BACKGROUND OF THE INVENTION

1) Field of the Invention

This invention relates to an image processing apparatus and an image processing method for correcting distortion of an image (particularly a document image) inputted from an image inputting apparatus such as, for example, a handheld image scanner, as well as a computer-readable recording medium on which an image processing apparatus is recorded.

2) Description of the Related Art

Generally, an image scanner is utilized as an apparatus for inputting an image to an information processing apparatus such as a personal computer. Heretofore, a preinstalled image scanner of the flat bed type or the drum scanner type is used as an image scanner. Meanwhile, a simple image scanner (handheld image scanner) which can be carried readily and held with a hand of a user to scan an image has been developed and provided as a product in recent years.

FIG. 16 is a plan view showing a configuration of a popular handheld image scanner and particularly showing an original contacting face of the handheld image scanner. Referring to FIG. 16, the handheld image scanner 10 shown basically includes a line sensor 11 for taking an image, a plurality of (four in FIG. 16) rollers 12 for contacting with and rolling on an image original by a scanning operation by a user (operator), and a first-order rotary encoder (not shown) for detecting the speed of rotation of the rollers 12 to detect the amount of movement of the image scanner 10 by a scanning operation. The rollers 12 have a common axis of rotation and are rotated integrally with one another. The line sensor 11 has a fixed length W as a width in a main scanning direction thereof.

In order to use the image scanner 10 described above to take an image, the user will hold the image scanner 10 with its hand and move the image scanner 10 in a predetermined direction (sub scanning direction) along an image of a sample object. Thereupon, the rollers 12 are rotated in response to the movement of the image scanner 10, and the speed of rotation of the rollers 12 is detected by the encoder. Then, at a timing corresponding to the detected speed of rotation of the rollers 12, image data (hereinafter referred to as line image data) for one line in the main scanning direction are obtained. Such line image data are transmitted line by line from the image scanner to an information processing apparatus. Consequently, the image of the sample object is taken as image data, wherein a plurality of rows of line image data extending along the main scanning direction are arranged in the sub scanning direction, into the information processing apparatus.

Where the image of the sample object is a document image, the operation direction (sub scanning direction) of the image scanner 10 by the user is ideally parallel or perpendicular to the direction of a character row of the document.

However, the image scanner 10 does not particularly include a mechanism for controlling the direction of movement thereof so that it may move only in one direction with respect to the image of the sample object. However, when the image scanner 10 is actually operated for scanning by the user, the rollers 12 described above exert some constraining force to act in a direction in which the image scanner 10 may move along a direction of rotation of the rollers 12. Nevertheless, the constraining force is so weak that it cannot control the direction of movement of the image scanner 10 to one direction.

Accordingly, the degree of freedom in operation of the handheld image scanner 10 by the user is so high that the operation direction (direction of movement) for scanning of the image scanner 10 varies independently of the consciousness of the user and the image read by the scanning is very liable to suffer from distortion.

It is considered here to move the image scanner 10 toward the user to read, for example, an image original placed in front of the user.

In this instance, if the user who is right-handed holds the image scanner 10 with the right hand and performs a scanning operation, then as the image scanner 10 approaches the user, the arm moves such that the right elbow escapes in the rightward direction. As the arm moves in this manner, the operation direction of the image scanner 10 is liable to be displaced to the rightward direction a little as seen in FIG. 17A while the user is not conscious of this. Conversely, where the user is left-handed, the operation direction is liable to be displaced to the leftward direction. The image read by the image scanner 10 in this instance suffers from displacement, that is, distortion, in the direction of the line sensor (main scanning direction) depending upon the position of the operation direction (sub scanning direction).

Further, according to circumstances, as the arm moves in such a manner as described above, while the operation direction of the image scanner 10 is displaced in the rightward direction, simultaneously a slip sometimes occurs on one end side (on the left side in FIG. 17B) as seen in FIG. 17B. This makes the scanning region by the image scanner 10 have a sectoral shape. The image data read by the image scanner 10 then suffer from distortion not only in the line sensor direction (main scanning direction) but also the operation direction (sub scanning direction).

Thus, a technique has conventionally been proposed wherein a handheld image scanner has an optical two-dimensional sensor embedded therein and is used to two-dimensionally detect how the image scanner body moves on an image original and image data read by the handheld image scanner are corrected in response to a result of the detection. Here, the optical two-dimensional sensor traces very small concave and convex conditions on an image forming face of paper or the like to detect in what manner the image scanner body moves two-dimensionally after the scanning operation is started.

However, since such a two-dimensional sensor as described above is expensive, where the two-dimensional sensor is incorporated in an image scanner, although distortion of image data can be corrected, there is a subject to be solved in that a high production cost is required for the image scanner. Therefore, it is demanded to make it possible to estimate and correct distortion of image data obtained by a line sensor using the image data without newly adding a two-dimensional sensor or a like element.

SUMMARY OF THE INVENTION

It is an object of the present invention to provide an image processing apparatus and an image processing method wherein distortion of read image data can be corrected using only the image data without using a two-dimensional sensor and image data of a high quality free from distortion can be obtained without giving rise to an increase of the production cost.

In order to attain the object described above, according to an aspect of the present invention, there is provided an image processing apparatus, comprising estimation means for estimating a displacement amount between part data which form image data based on a cross-correlation between the part data, and correction means for correcting the image data so as to cancel a displacement in the image data based on the displacement amount estimated by the estimation means.

According to another aspect of the present invention, there is provided an image processing method, comprising an estimation step of estimating a displacement amount between part data which form image data based on a cross-correlation between the part data, and a correction step of correcting the image data so as to cancel a displacement in the image data based on the displacement amount estimated by the estimation step.

According to a further aspect of the present invention, there is provided a computer-readable recording medium on which an image processing program is recorded, the image processing program causing a computer to function as the estimation means and the correction means of the image processing apparatus of the present invention described above.

According to the present invention, the fact that, paying attention to a general structure of an image (particularly a document image), one-dimensional image data (partial data) which are not spaced by a great distance from each other do not exhibit a great variation is utilized to estimate a displacement amount between the partial data in a predetermined direction based on a cross-correlation between the partial data. Then, the image data are corrected based on the displacement amount. Consequently, it is possible to use only read image data to correct displacement (one-dimensional distortion) of the image data without using a two-dimensional sensor.

With the image processing apparatus, the image processing method and the computer-readable recording medium on which the image processing program is recorded, since it is possible to use only read image data to correct displacement (one-dimensional distortion) of the image data without using a two-dimensional sensor, image data of a high quality free from distortion can be obtained without giving rise to an increase of the production cost.

It is assumed here that the image data are read, for example, by a handheld image scanner (one-dimensional line sensor) and composed of a plurality of lines of line image data extending along the main scanning direction and arranged in the sub scanning direction. In this instance, in the present invention, a displacement amount in the main scanning direction between two lines of line image data successively extracted from the image data is estimated based on a cross-correlation between the line image data, and the image data are corrected based on the estimated displacement amount in the main scanning direction so that the displacement in the main scanning direction may be eliminated. Accordingly, even if a slip in the main scanning direction (direction of the line sensor) occurs when the handheld image scanner is operated for scanning and causes some distortion (displacement in the main scanning direction) to occur with the image data, the distortion can be eliminated thereby to obtain image data of a high picture quality free from distortion.

Further, in the present invention, a displacement amount in the main scanning direction is estimated based on a cross-correlation between line image data successively extracted in a spaced relationship from each other by a suitable distance in the sub scanning direction. When a human being operates a handheld image scanner while taking care that the operation direction for scanning may not turn away, there is the possibility that displacement approximately by a one-pixel distance in the main scanning direction may occur normally when the image scanner is moved forwardly or backwardly by a distance corresponding to approximately 10 lines. Accordingly, where a displacement amount in the main scanning direction is estimated based on a cross-correlation between line image data spaced by a suitable distance (for example, a 5- to 20-line distance) from each other as described above, the amount of calculation for estimating displacement amounts in the main scanning direction can be reduced. Consequently, an image correction process can be performed efficiently and simultaneously the accuracy in calculation of the displacement amount in the main scanning direction can be improved.

In this instance, the displacement amount of line image data of each of lines present between the lines of the line image data spaced from each other by the suitable distance is calculated by linear interpolation based on the displacement amount in the main scanning direction, and the image data are corrected based on results of such linear interpolation. Consequently, the displacement amount in the main scanning direction estimated for the lines spaced by the suitable distance from each other is allocated linearly to the line image data of the intermediate lines, and accordingly, correction of the image data is performed smoothly.

Furthermore, where the linear interpolation is performed after a smoothing process is performed for the estimated displacement amounts in the main scanning direction so that the displacement amounts in the main scanning direction may be present along a smooth curve, a sharp displacement of the image data which arises from a sharp movement of the image scanner can be eliminated appropriately. Consequently, image data of a higher picture quality can be obtained.

According to a still further aspect of the present invention, there is provided an image processing apparatus for performing a process for image data which are a plurality of rows of line image data extending along a main scanning direction defined as a leftward and rightward direction expediently, and arranged in a sub scanning direction defined as an upward and downward direction expediently, comprising estimation means for estimating, based on a cross-correlation between part data which form the plurality of rows of line image data, displacement amounts in the main scanning direction on the left side and the right side of the image data, detection means for detecting inclinations of an image on the opposite upper and lower sides of the image data based on the image data, and reconfiguration means for reconfiguring the image data based on the displacement amounts in the main scanning direction estimated by the estimation means and the inclinations detected by the detection means to cancel a distortion of the image data.

Also with the image processing apparatus, the fact that, paying attention to a general structure of an image (particularly a document image), one-dimensional image data (partial data) which are not spaced by a great distance from each other do not exhibit a great variation is utilized to estimate displacement amounts of the left side and the right side of the image data in the main scanning direction based on a cross-correlation between the partial data. Then, in the image processing apparatus, inclinations of the image on the opposite upper and lower sides of the image data are detected, and an original outer shape of the image data is estimated based on the displacement amounts and the inclinations to perform reconfiguration of the image data. Consequently, any distortion of the image data is eliminated. Accordingly, it is possible to use only read image data to correct two-dimensional distortion of the image data without using a two-dimensional sensor.

With the image processing apparatus, since it is possible to use only read image data to correct two-dimensional distortion of the image data without using a two-dimensional sensor, image data of a high quality free from distortion can be obtained without giving rise to an increase of the production cost.

Further, since line image data are successively extracted in a spaced relationship from each other by a suitable distance (a 5- to 20-line distance) in the sub scanning direction from the image data in the left side image data area and the right side image data area and displacement amounts on the left side and the right side in the main scanning direction are estimated based on a cross-correlation between the extracted line image data, the amount of calculation for estimating displacement amounts in the main scanning direction can be reduced. Consequently, an image correction process can be performed efficiently, and simultaneously the accuracy in calculation of the displacement amount in the main scanning direction can be improved.

Further, where reconfiguration of the image is performed after a smoothing process is performed for the estimated displacement amounts in the main scanning direction so that the displacement amounts in the main scanning direction may be present along a smooth curve, a sharp displacement of the image data which arises from a sharp movement of the image scanner can be eliminated appropriately. Consequently, image data of a higher picture quality can be obtained. Besides, where a Bezier curve is used for the smoothing process in this instance, the reconfiguration of the image data can be performed readily using a parameter of the Bezier curve.

Furthermore, where the image data represent a document image, the inclinations of the image on the opposite upper and lower sides of the image data can be determined readily based on inclinations of character trains which form the document image.

According to a yet further aspect of the present invention, there is provided an image processing apparatus for performing a process for image data are a plurality of rows of line image data extending along a main scanning direction defined as a leftward and rightward direction expediently, and arranged in a sub scanning direction defined as an upward and downward direction expediently, comprising division means for dividing the image data into a plurality of blocks in the sub scanning direction, inclination estimation means for estimating inclinations of an image on the opposite upper and lower sides of each of the blocks obtained by the division by the division means, displacement amount estimation means for estimating displacement amounts in the main scanning direction on the left side and the right side of each of the blocks based on a cross-correlation between part data which form line image data in the block, and reconfiguration means for reconfiguring, for each of the blocks, the image data in the block based on the displacement amounts in the main scanning direction estimated by the displacement amount estimation means and the inclinations of the image on the opposite upper and lower sides of the block estimated by the inclination estimation means to cancel a distortion of the image data in the block.

In the image processing apparatus, image data are divided into a plurality of blocks in the sub scanning direction first, and then inclinations of the image on the opposite upper and lower sides of each of the blocks are estimated. Then, the fact that, paying attention to a general structure of an image (particularly a document image), one-dimensional image data (partial data) which are not spaced by a great distance from each other do not exhibit a great variation is utilized to estimate, for each of the blocks, displacement amounts of the left side and the right side of the image data in the main scanning direction based on a cross-correlation between the partial data. Then, in the image processing apparatus, for each of the blocks, an original outer shape of the block is estimated based on the estimated inclinations and displacement amounts to perform reconfiguration of the image data. Consequently, any distortion of the image data in each block is eliminated. Therefore, even if a handheld image scanner meandered upon reading of the image data by the image scanner, it is possible to use only the image data read by the image scanner to correct two-dimensional distortion of the image data arising from the meandering without using a two-dimensional sensor.

With the image processing apparatus, since image data are divided into a plurality of blocks and reconfiguration of image data in the blocks is performed for each of the blocks, for example, even if a handheld image scanner meandered upon reading of the image data by the image scanner, it is possible to use only the image data read by the image scanner to correct two-dimensional distortion of the image data arising from the meandering without using a two-dimensional sensor. Consequently, image data of a high quality free from distortion can be obtained without giving rise to an increase of the production cost.

In this instance, the inclination of the image on the boundary between two adjacent blocks is estimated as the inclination of the boundary based on the image data which are present on the opposite sides of the boundary, and the estimated inclination of the boundary is adopted as an estimation result of the inclination of the image on the lower side of the upper side one of the two blocks and the inclination of the image on the upper side of the lower side one of the two blocks. In other words, through estimation of the inclination of the one boundary, the lower side inclination of the upper side block and the upper side inclination of the lower side block can be estimated simultaneously. Further, since the lower side inclination of the upper side block and the upper side inclination of the lower side block are not estimated separately from each other but estimated as the common inclination and therefore have an equal inclination, the blocks after the reconfiguration are connected with certainty to each other without a gap left therebetween in the sub scanning direction.

When inclinations of a plurality of boundaries are estimated, it is determined that the inclination of a boundary having an angle greater than a predetermined angle with respect to another directly neighboring boundary or a boundary which intersects with another boundary in the image area has been estimated in error, and two blocks on the opposite sides of the erroneous boundary are integrated into a single block and necessary processing is performed for the single block. Consequently, any boundary whose inclination has been estimated in error is abandoned. Therefore, image reconfiguration which may be performed based on such an erroneous inclination can be prevented, and image reconfiguration having little error can be achieved.

On the other hand, if a result of the estimation indicates that the lower side inclination of the upper side block and the upper side inclination of the lower side block have an equal inclination, then the image data in each of the blocks are reconfigured so that tangential lines in the sub scanning direction of the image area at the left and right ends of the opposite upper and lower sides and the inclinations on the opposite upper and lower sides may intersect perpendicularly with each other. Consequently, when blocks after the reconfiguration are connected to each other, the tangential lines in the sub scanning direction of the image area at the left and right ends of the boundary become smooth, and image data of a higher picture quality can be obtained.

Furthermore, where the image data represent a document image, the inclinations of the image on the opposite upper and lower sides of each of the blocks can be determined readily based on inclinations of character trains which form the document image.

The above and other objects, feature and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 23 is a diagrammatic view illustrating an example of selection of control points of a Bezier curve by the image processing apparatus of FIG. 18;

FIG. 24 is a schematic view illustrating a connection state (connection states at the left and right ends of a boundary) between blocks after reconfiguration by the image processing apparatus of FIG. 18; and FIGS. 25 to 27 are schematic views illustrating an image processing technique of the image processing apparatus of FIG. 18.

DESCRIPTION OF THE PREFERRED EMBODIMENTS

Figure 1:
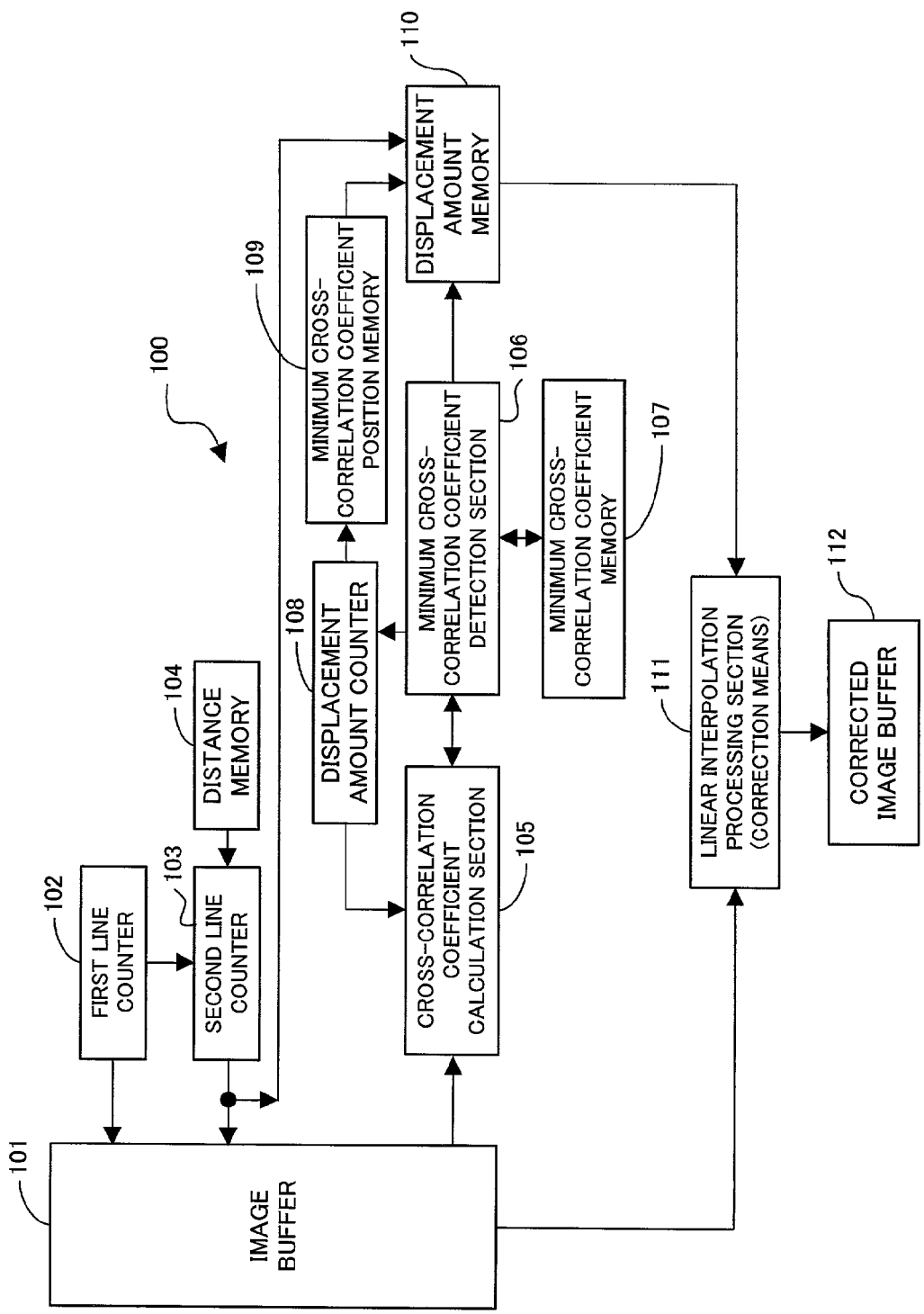
FIG. 1 is a block diagram showing a configuration of an image processing apparatus according to a first embodiment of the present invention.

In the following, embodiments of the present invention are described with reference to the drawings.

Image processing apparatus (refer to reference characters 100, 100A, 100B and 100C) of the embodiments use image data read, for example, by a handheld image scanner (refer to reference numeral 10 of FIG. 16) as a processing object. Such image data as just mentioned are configured such that a large number of rows of line image data extending along a main scanning direction (defined as a leftward and rightward direction expediently) are arranged in a sub scanning direction (defined as an upward and downward direction expediently).

Further, the image processing apparatus of the embodiments make use of the fact that, paying attention to a general structure of an image, one-dimensional image data (line image data) which are not spaced by a great distance from each other do not exhibit a great variation. In particular, a displacement amount between lines is estimated using a cross-correlation between line image data (which may be hereinafter referred to simply as lines).

While the resolution of, for example, an image scanner which is used popularly is approximately 200 to 1,200 dpi, in this instance, a character of the size of 12 points which is used popularly is composed approximately of 33 to 200 pixels. Where a character is composed of such a number of pixels as just mentioned, it is expected that two lines spaced by approximately 10 pixels from each other be substantially same as each other. Further, ruled lines and punctuation marks are used frequently in a document. Since they have many components formed from straight lines, the nature that such two lines as mentioned above are substantially same is further reinforced.

[1] First Embodiment of the Invention

FIG. 1 shows a configuration of an image processing apparatus according to a first embodiment of the present invention. Referring to FIG. 1, the image processing apparatus 100 of the first embodiment includes an image buffer 101, a first line counter 102, a second line counter 103, a distance memory 104, a cross-correlation function calculation section 105, a minimum cross-correlation coefficient detection section 106, a minimum cross-correlation coefficient memory 107, a displacement amount counter 108, a minimum cross-correlation coefficient position memory 109, a displacement amount memory 110, a linear interpolation processing section 111 and a corrected image buffer 112.

Actually, however, the image processing apparatus 100 is implemented by an information processing apparatus such as, for example, a personal computer.

In particular, memories (a RAM, a ROM, a hard disk and the like) in the information processing apparatus function as the image buffer 101, first line counter 102, second line counter 103, distance memory 104, minimum cross-correlation coefficient memory 107, displacement amount counter 108, minimum cross-correlation coefficient position memory 109, displacement amount memory 110 and corrected image buffer 112.

Further, functions (functions as estimation means and correction means hereinafter described) as the cross-correlation coefficient calculation section 105, minimum cross-correlation coefficient detection section 106, and linear interpolation processing section 111 are implemented by a CPU in the information processing apparatus executing a predetermined image processing program. In this manner, the image processing apparatus 100 of the present embodiment is implemented by starting up and executing the image processing program in the information processing apparatus. Actually, however, the image processing program is stored on the hard disk of the information processing apparatus, and is read out from the hard disk into a memory (RAM or the like) and then started up and executed by the CPU.

Here, a computer-readable recording medium on which the image processing program of the present embodiment is recorded is described. In the present embodiment, it is described that the image processing program is recorded in advance on the hard disk and is read out into the memory (RAM or the like) and started up when necessary. However, the image processing program need not necessarily be recorded on the hard disk.

The image processing program may be loaded from a portable recording medium on which the image processing program is recorded in advance into an information processing apparatus which is to function as the image processing apparatus 100. Otherwise, the information processing apparatus may download the image processing program from a storage apparatus of a server in which the image processing program is stored in advance by communicating with the server through a communication circuit such as the Internet. It is to bed noted that the server is owned, for example, by a program provider. Further, the image processing program downloaded from an external apparatus into the information processing apparatus may be stored not onto a hard disk but into an auxiliary storage apparatus connected to the information processing apparatus. In the case just described, the image processing program is read out from the auxiliary storage apparatus into a memory (RAM or the like) in the information processing apparatus and is executed by the information processing apparatus.

The portable recording medium mentioned hereinabove is a computer-readable recording medium such as, for example, a flexible disk or a CD-ROM. Further, the storage apparatus of the server and the auxiliary storage apparatus described above are storage apparatus (computer-readable recording media) such as, for example, a magnetic disk, an optical disk or a magneto-optical disk. Further, as a recording medium for recording the image processing program, not only an IC card, a ROM cartridge, a magnetic tape cartridge and a punched card but also various computer-readable media such as a printed matter on which a code such as a barcode is printed can be utilized.

Figure 16:
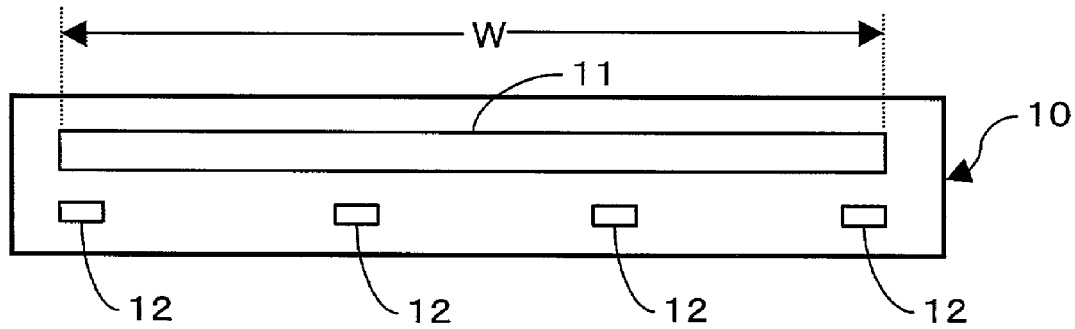
FIG. 16 is a plan view showing a configuration of a popular handheld image scanner and particularly showing an original contacting face of the handheld image scanner.

The image buffer 101 stores image data read, for example, by a handheld image scanner (refer to reference numeral 10 of FIG. 16). The image data are configured such that a large number of rows of line image data extending along a main scanning direction [leftward and rightward direction; the direction of a one-dimensional line sensor (refer to reference numeral 11 of FIG. 16)] are arranged in a sub scanning direction (upward and downward direction).

The first line counter 102 and the second line counter 103 designate two lines (partial data) spaced from each other by a predetermined space as a calculation object of a cross-correlation coefficient. Lines corresponding to values indicated by the line counters 102 and 103 are outputted from the image buffer 101 to the cross-correlation coefficient calculation section 105. Here, the values of the line counters 102 and 103 indicate to what numbered lines the line image data to be read out from the image buffer 101 correspond. However, in the present embodiment, the lines are numbered such that the first line is a line numbered 0, that is, a 0th line.

The space (that is, line number corresponding to the distance in the sub scanning direction) d between the two lines described above is set in advance in the distance memory 104, and it is indicated by the value d by what distance the two lines whose cross-correlation should be determined should be spaced from each other. A value obtained by adding the value of the first line counter 102 to the value d of the distance memory 104 is set into the second line counter 103. Accordingly, a line spaced by the predetermined distance d from the line designated by the first line counter 102 in the sub scanning direction is designated by the second line counter 103. It is to be noted that a value from 5 to 20 is suitable as the space d from a reason hereinafter described. Particularly, in the present embodiment, 10 is set as the value of the space d.

The cross-correlation coefficient calculation section 105 reads out line image data (part data) of two lines corresponding to the values set to the line counters 102 and 103 from the image buffer 101 and calculates a cross-correlation coefficient between the line image data of the two lines in accordance with an expression (1) hereinafter given. Thereupon, the cross-correlation coefficient calculation section 105 calculates a cross-correlation coefficient when the displacement amount between the line image data of the two lines described above in the main scanning direction is a value (pixel number) s set to the displacement amount counter 108 in accordance with the expression (1) hereinafter given. More particularly, the cross-correlation coefficient calculation section 105 calculates a cross-correlation coefficient when the second line designated by the second line counter 103 is displaced by the value s in the main scanning direction with respect to the first line designated by the first line counter 102. It is to be noted that, when the first and second lines are same as each other, the cross-correlation coefficient calculated in accordance with the expression (1) hereinafter given is zero, and the cross-correlation coefficient increases as the degree of similarity between the first and second lines decreases.

The minimum cross-correlation coefficient detection section 106 detects a minimum cross-correlation coefficient from among a plurality of cross-correlation coefficients calculated by the cross-correlation coefficient calculation section 105 for each of different displacement amounts within a predetermined range (in the present embodiment, three values of −1, 0, 1 as hereinafter described). The minimum cross-correlation coefficient detection section 106 utilizes the minimum cross-correlation coefficient memory 107, displacement amount counter 108 and minimum cross-correlation coefficient position memory 109 to detect and decide a minimum cross-correlation coefficient as hereinafter described with reference to FIG. 3.

Here, different values of the displacement amount to be substituted into the expression (1) (the value s within the predetermined range described above) are successively set to the displacement amount counter 108 by the minimum cross-correlation coefficient detection section 106.

Further, a minimum one of cross-correlation coefficients calculated by the cross-correlation coefficient calculation section 105 is stored into the minimum cross-correlation coefficient memory 107. In particular, every time a cross-correlation coefficient with regard to a certain one displacement amount is calculated by the cross-correlation coefficient calculation section 105, the minimum cross-correlation coefficient detection section 106 compares the cross-correlation coefficient calculated in the present calculation cycle with a minimum cross-correlation coefficient stored in the minimum cross-correlation coefficient memory 107 (a minimum one of more than one cross-correlation coefficient calculated by the preceding calculation cycle). Then, if the cross-correlation coefficient in the present cycle is lower, then the minimum cross-correlation coefficient detection section 106 rewrites the value of the minimum cross-correlation coefficient memory 107 with the cross-correlation coefficient of the present cycle, but otherwise, the minimum cross-correlation coefficient detection section 106 does not rewrite the value of the minimum cross-correlation coefficient memory 107 so that the value of the minimum cross-correlation coefficient memory 107 may be maintained.

If the value of the minimum cross-correlation coefficient memory 107 is rewritten with a new cross-correlation coefficient, then the value of the displacement amount used for the calculation of the new cross-correlation coefficient (that is, the value s of the displacement amount counter 108) is written as a minimum cross-correlation coefficient position into the minimum cross-correlation coefficient position memory 109. Accordingly, in the minimum cross-correlation coefficient position memory 109, the values of the displacement amount when the cross-correlation coefficient between the line image data of the two lines exhibits a minimum value is stored at a point of time when calculation of the cross-correlation coefficient with regard to all displacement amounts within the predetermined range is completed.

The displacement amount memory 110 stores a displacement amount detected and determined by the minimum cross-correlation coefficient detection section 106 in a coordinated relationship to the value of the second line counter 103. In the present embodiment, the values stored in the minimum cross-correlation coefficient position memory 109 at the point of time when calculation of the cross-correlation coefficient with regard to all displacement amounts within the predetermined range is completed (that is, the value s of the displacement amount when the cross-correlation coefficient between the first line and the second line exhibits a minimum value) is stored as an estimation result of the displacement amount in the main scanning direction of the second line with respect to the first line into the displacement amount memory 110. It is to be noted that, in the present embodiment, when merely the term "displacement amount" is used, the "displacement amount" is a displacement amount in the main scanning direction.

After the calculation of the cross-correlation coefficient with regard to all displacement amounts within the predetermined range described above, the value of the second line counter 103 is newly placed into the first line counter 102 while a value obtained by adding the value of the distance memory 104 to the newly set value of the first line counter 102 is placed into the second line counter 103. Then, the displacement amount in the main scanning direction with regard to a new set of first and second lines is estimated and calculated. In this manner, the displacement amount in the main scanning direction is estimated for each line image data of lines spaced by the predetermined distance d from each other with regard to all image data stored in the image buffer 101, and such estimation results are stored into the displacement amount memory 110.

In the present embodiment, estimation means for estimating a displacement amount between line image data, which form image data, based on a cross-correlation of the line image data is formed from the first line counter 102, second line counter 103, distance memory 104, cross-correlation coefficient calculation section 105, minimum cross-correlation coefficient detection section 106, minimum cross-correlation coefficient memory 107, displacement amount counter 108 and minimum cross-correlation coefficient position memory 109 described above.

Particularly, the estimation means in the present embodiment successively extracts line image data of lines spaced from each other by the predetermined distance d in the sub scanning direction from the image data stored in the image buffer 101 and estimates a displacement amount in the main scanning direction between the line image data based on a cross-correlation between the extracted line image data, and besides writes the estimated displacement amount in the main scanning direction between the line image data into the displacement amount memory 110.

The linear interpolation processing section (correction means) 111 corrects the displacement of the image data so as to cancel the displacement in the main scanning direction based on the displacement amount written in the displacement amount memory 110, that is, the displacement amount in the main scanning direction estimated by the estimation means. More particularly, the linear interpolation processing section 111 successively reads out the lines which form the image data from the image buffer 101, adjusts and converts the positions of the lines in the main scanning direction in response to the displacement amounts of the displacement amount memory 110, and writes the data after the adjustment into the corrected image buffer 112.

In this instance, the linear interpolation processing section 111 determines displacement amounts in the main scanning direction of the individual lines which exist between the first and second lines described above by performing linear interpolation based on the displacement amounts in the main scanning direction and adjusts the positions of the lines in the main scanning direction based on a result of the linear interpolation. A detailed technique of the linear interpolation is hereinafter described.

The corrected image buffer 112 stores the corrected image obtained by the linear interpolation processing section 111 as described above.

Now, operation of the image processing apparatus 100 of the first embodiment described above is described with reference to FIGS. 2, 3 and 4A to 4C.

Figure 2:
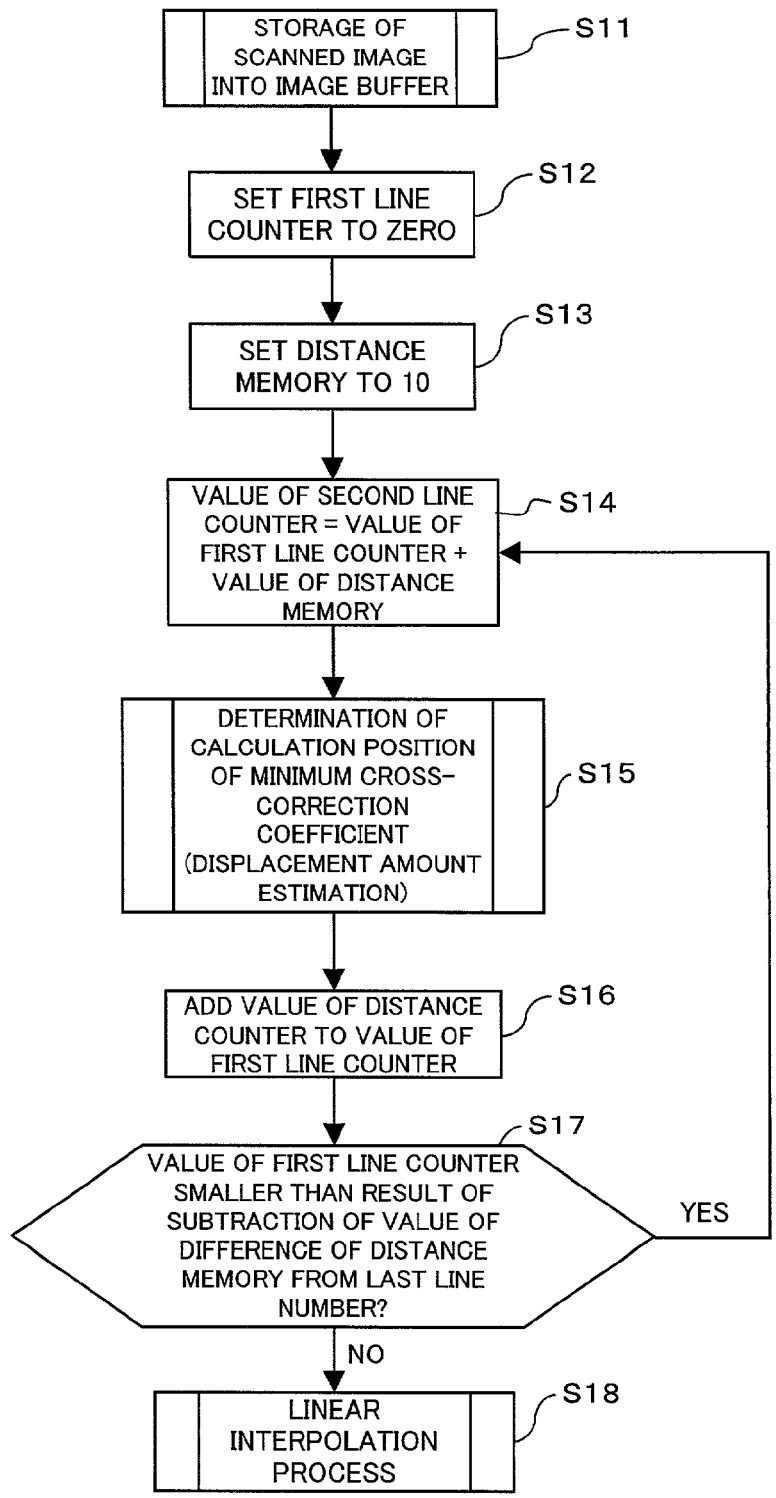
FIG. 2 is a flow chart illustrating an image processing procedure of the image processing apparatus of FIG. 1.

First, an image processing procedure of the first embodiment is described with reference to a flow chart (steps S11 to S18) shown in FIG. 2.

Figure 17A:
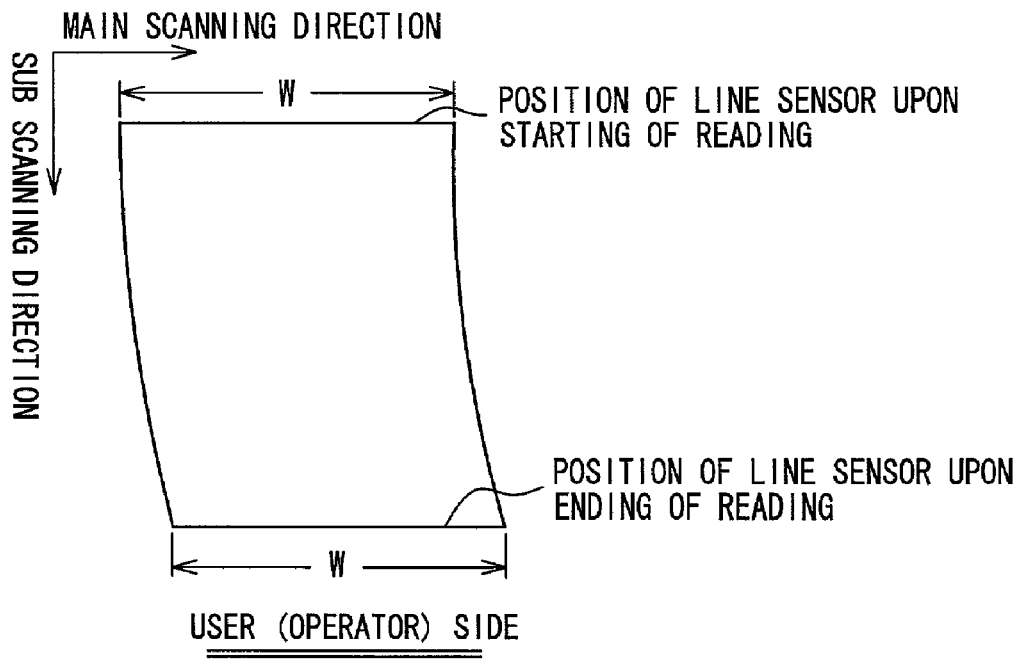
FIGS. 17A and 17B are schematic views showing different examples of a scanning region by a handheld image scanner.

In the present embodiment, a predetermined document image is first read, for example, by such a handheld image scanner 10 as described hereinabove with reference to FIG. 16, and the read image data are stored into the image buffer 101 (step S11). It is assumed that, upon the reading just described, in the first embodiment, the image scanner 10 slips in the leftward or rightward direction (main scanning direction) by a scanning operation of an operator, and consequently, for example, such an area as shown in FIG. 17A is scanned by the image scanner 10.

Then, the number "0" of the top line of the image data is placed into the first line counter 102 (step S12). Further, "10" is placed as the distance (line number) d between two lines of an object of calculation of the cross-correlation coefficient into the distance memory 104 (step S13). Furthermore, a value obtained by adding the value of the first line counter 102 and the value of the distance memory 104 (the initial value is "10") is placed into the second line counter 103 (step S14).

Thereafter, the cross-correlation coefficient calculation section 105 reads out two lines (first the 0th line and the 10th line) corresponding to the values set in the first line counter 102 and the second line counter 103 from the image buffer 101. Then, the position of the second line with respect to the first line at which the cross-correlation coefficient between the two lines exhibits a minimum value is calculated and estimated as a displacement amount in the main scanning direction in accordance with a procedure which is hereinafter described with reference to FIG. 3 (step S15; estimation step).

After a displacement is estimated, the value d of the distance memory 104 is added to the value of the first line counter 102 (step S16), and it is checked based on the value set newly in the first line counter 102 whether or not the second line which is a next calculation object of a cross-correlation coefficient exceeds the size (last line) of the image data (step S17). In this step S17, it is checked whether or not the new set value of the first line counter 102 is smaller than a result of subtraction of the value d of the distance memory 104 from the last line number of the image.

If the second line remains within the range up to the last line (Yes route of step S17), then the processing in steps S14 to S17 is executed repetitively. However, if the next second line is not within the range up to the last line (NO route of step S17), then it is discriminated that the displacement amount estimation for the entire region of the image data is completed, and the linear interpolation processing section 111 corrects the displacement of the image data based on the displacement amounts written in the displacement amount memory 110 while performing such a general linear interpolation process as hereinafter described so that the displacements of the image data in the main scanning direction may be eliminated (step S18; correction step).

Now, the displacement amount estimation procedure in step S15 (estimation step) is described with reference to a flow chart (steps S21 to S28) shown in FIG. 3.

First, "−1" is placed as an initial value of the displacement amount of the second line with respect to the first line into the displacement amount counter 108 (step S21). In the present embodiment, it is assumed that the maximum displacement amount in the main scanning direction which appears when the image scanner 10 is moved forwardly or backwardly by a distance corresponding to 10 lines is equal to a distance corresponding to approximately one pixel, and the value s (range of displacement) to be placed into the displacement amount counter 108 is limited to the three values of −1, 0 and 1.

Then, a maximum value which can be placed into the minimum cross-correlation coefficient position memory 109 is placed into the memory 109 (step S22), and a cross-correlation coefficient between the first line designated by the first line counter 102 and the second line designated by the second line counter 103 is calculated in accordance with the following expression (1) where the second line is displaced by the value placed in the displacement amount counter 108 from the first line by the cross-correlation coefficient calculation section 105 (step S23). The technique of calculating the cross-correlation coefficient may be a common technique.

[Cross-Correlation Coefficient]$=\Sigma\{V_A(i)-V_B(i+s)\}^2$ (1)

where "$\Sigma$" represents calculation of the sum total from i=0 to N−1; N the number of pixels which form a line; $V_A(i)$ the value of the ith pixel in the first line designated by the first line counter 102; $V_B(i)$ the value of the ith pixel in the second line designated by the second line counter 103; and s the displacement amount (value placed in the displacement amount counter 108) as described above. According to the expression (1) above, the sum total of $\Sigma\{V_A(i)-V_B(i+s)\}^2$ calculated for the pixels is calculated as a cross-correlation coefficient.

The cross-correlation coefficient calculated by the cross-correlation coefficient calculation section 105 is compared with the value placed in the minimum cross-correlation coefficient memory 107 (value of the minimum cross-correlation coefficient in the past) by the minimum cross-correlation coefficient detection section 106 (step S24). If a result of the comparison indicates that the value of the cross-correlation coefficient calculated in the present cycle is lower than the set value of the minimum cross-correlation coefficient memory 107 (YES route of step S24), then the minimum cross-correlation coefficient detection section 106 rewrites the value of the minimum cross-correlation coefficient memory 107 into the cross-correlation coefficient of the present cycle and stores the value s of the displacement amount counter 108 used for the calculation in the present cycle as a minimum cross-correlation coefficient position into the minimum cross-correlation coefficient position memory 109 (step S25). Thereafter, the value of the displacement amount counter 108 is incremented by "1" (step S26).

On the other hand, if the value of the cross-correlation coefficient calculated in the present cycle is equal to or higher than the set value of the minimum cross-correlation coefficient memory 107 (NO route of step S24), then the value of the minimum cross-correlation coefficient memory 107 is maintained without being rewritten. Thereafter, the value of the displacement amount counter 108 is incremented by "1" (step S26).

Then, it is discriminated whether or not the new value of the displacement amount counter 108 (value after the increment by "1") is "2" (step S27). If the new value is not "2" (NO route), then the processing in steps S23 to S27 is executed repetitively.

On the other hand, if it is discriminated that the new value of the displacement amount counter 108 is "2" (YES route of step S27), then it is discriminated that the processing for the displacement amounts of −1, 0 and 1 within the predetermined range described above is completed. At this point of time, the displacement amount stored in the minimum cross-correlation coefficient position memory 109 is additionally registered as an estimation result of the displacement amount in the main scanning direction of the second line with respect to the first line into the displacement amount memory 110 (step S28). In this instance, the estimated displacement amount in the main scanning direction and the value (line number) of the second line counter 103 are coordinated with each other.

Figure 4A:
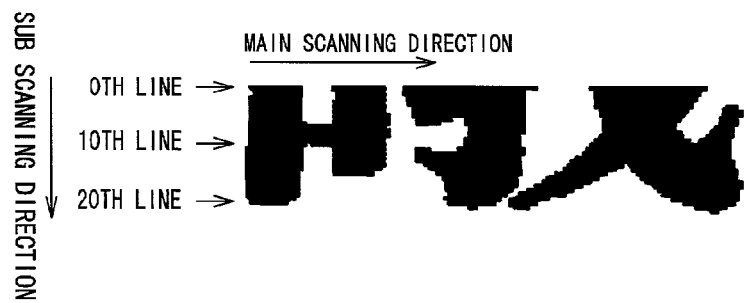
FIGS. 4A to 4C are schematic views particularly illustrating an image processing technique of the image processing apparatus of FIG. 1.
Figure 4B:
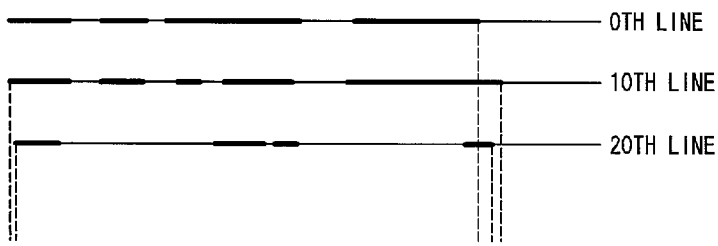
Figure 4C:
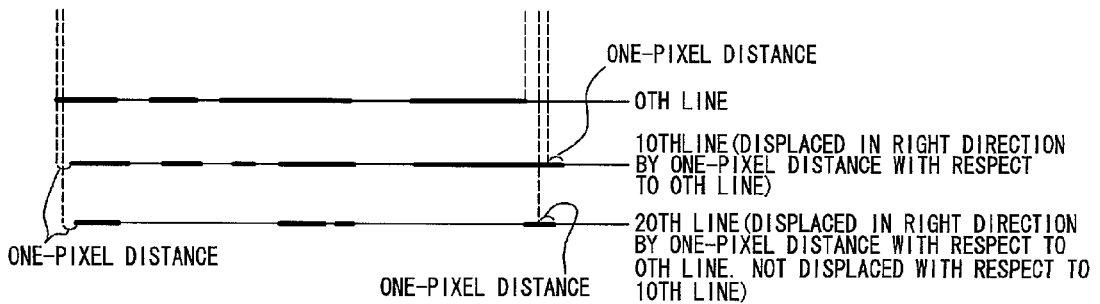

Now, the image processing technique of the first embodiment is described more particularly with reference to FIGS. 4A to 4C.

FIG. 4A shows part of image data (a lower portion of a certain Chinese character) actually read, for example, by the image scanner 10 described hereinabove in an enlarged scale. Here, the image processing technique of the first embodiment is described in connection with a case wherein it is applied to the image data illustrated in FIG. 4A.

Line image data are cut out for each 10 lines as seen in FIG. 4B from the image data illustrated in FIG. 4A. In FIG. 4B, the 0th line image data (0th line), 10th line image data (10th line) and 20th line image data (20th line) of the image data of FIG. 4A are shown. In FIG. 4B, the line image data of the three lines are indicated in a state wherein they keep a mutual positional relationship in the image data of FIG. 4A in regard to both of the main scanning direction and the sub scanning direction.

Figure 3:
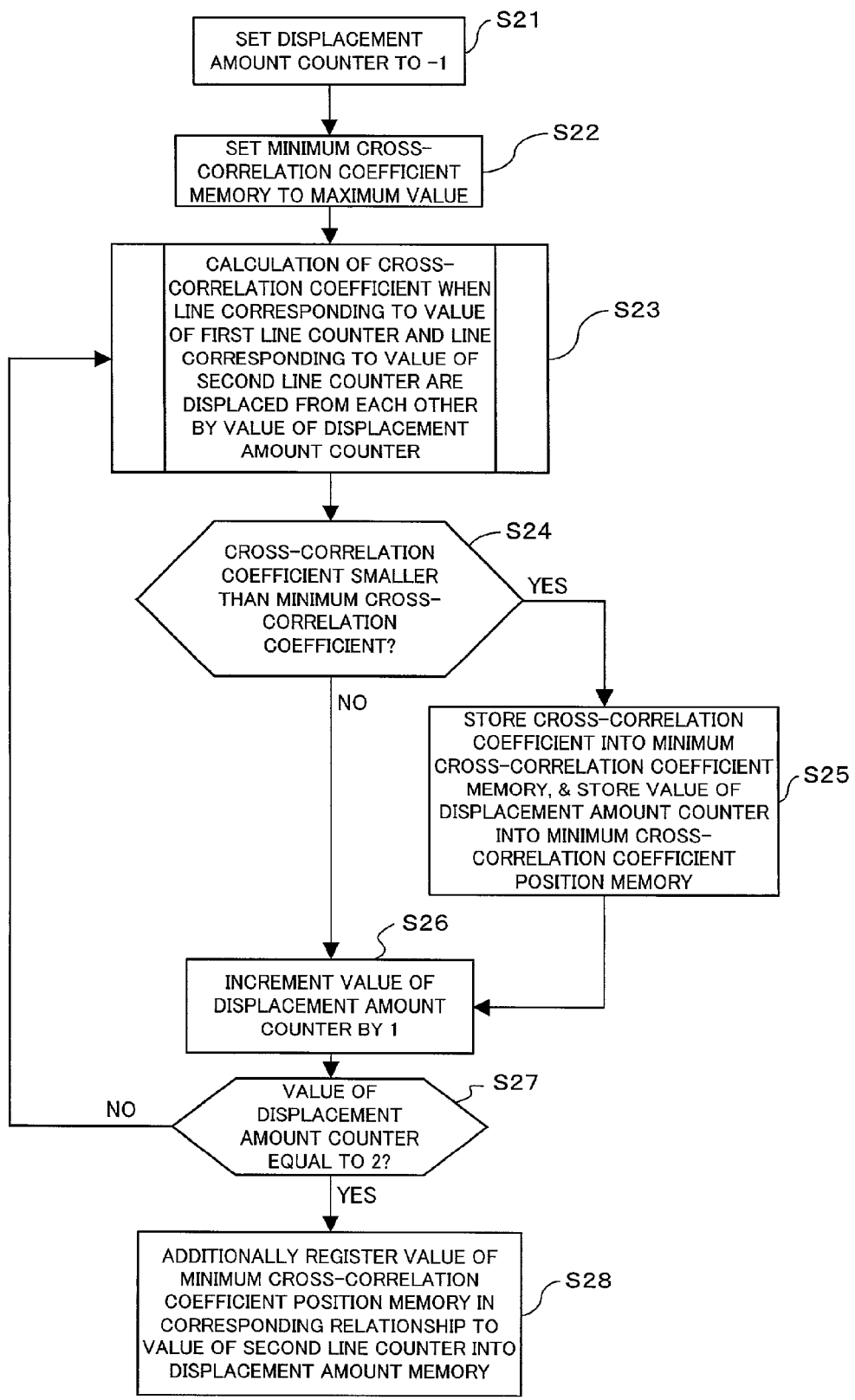
FIG. 3 is a flow chart illustrating a displacement amount estimation procedure of the image processing apparatus of FIG. 1.

It is assumed that, where the technique described hereinabove with reference to FIG. 3 is applied to the 0th line and the 10th line cut out in such a manner as illustrated in FIG. 4B, the cross-correlation coefficient between the two lines exhibits a minimum value when the 10th line is shifted by a distance equal to one pixel in the rightward direction with respect to the 0th line. Similarly, it is assumed that, where the technique described hereinabove with reference to FIG. 3 is applied to the 10th line and the 20th line cut out in such a manner as illustrated in FIG. 4B, the cross-correlation coefficient between the two lines exhibits a minimum value when the shift amount of the 20th line with respect to the 10th line is 0.

In accordance with such results of the displacement amount estimation as just described, the line image data of the three lines illustrated in FIG. 4B are corrected in such a manner as illustrated in FIG. 4C. In particular, the 10th line is shifted by a one-pixel distance in the rightward direction with respect to the 0th line, and the 20th line is shifted by a one-pixel distance in the rightward direction with respect to the 0th line. It is to be noted that, since, according to the estimation results described above, it is estimated that the 20th line is not displaced from the 10th line, the 20th line is moved by a one-pixel distance in the rightward direction with respect to the 0th line so that the relative positional relationship between the 10th line and the 20th line may not vary.

Further, in this instance, the lines which exist between the lines between which the cross-correlation coefficients are determined (that is, the 1st to 9th lines and the 11th to 19th lines) are corrected through the following straight line interpolation processing (linear interpolation processing) applied thereto by a function of the linear interpolation processing section 111. For example, in the example illustrated in FIGS. 4B and 4C, since the 10th line is displaced rightwardly by one pixel distance from the 0th line, the 0th to 5th lines remain disposed at their positions whereas the 6th to 10th lines are shifted rightwardly each by one pixel distance. On the other hand, since it is estimated that no displacement occurs with the 10th to 20th lines, the 11th to 20th lines are kept in their individual positions with respect to the 10th line, and in other words, the 11th to 20th lines are individually shifted to the positions displaced rightwardly by a one-pixel distance with respect to the original image.

It is to be noted that, in the present embodiment, the distance (interval) d between two lines which are selected as an object of calculation of a cross-correlation coefficient is set to 10 lines (that is, 10 lines in the sub scanning direction). This arises from the following reason.

According to an experiment conducted by the inventors of the present invention, when a human being operates a handheld image scanner while taking care that the operation direction for scanning may not turn away, the displacement amount in the main scanning direction which appears with image data read by the image scanner is a one-pixel distance between lines which are spaced from each other by a distance corresponding substantially to 10 lines (10 pixels) in the sub scanning direction.

Therefore, in the present invention, a value within the range from 5 to 20 is set as the distance d between two lines to be used as an object of calculation of a cross-correlation coefficient, and preferably, a value around 10 is set. If the distance d is smaller than 5, then the displacement in the main scanning direction cannot be detected. Conversely, if the distance d exceeds 20 and is, for example, approximately 100, then there is the possibility that a cross-correlation coefficient may be calculated with regard to two lines which have no cross-correlation therebetween, and consequently, an effective displacement amount cannot be estimated.

In this manner, with the image processing apparatus 100 of the first embodiment of the present invention, it is possible to use only read image data to correct displacement (one-dimensional distortion) of the image data with certainty without using a two-dimensional sensor. For example, even if such a slip in the main scanning direction (line sensor direction) as seen in FIG. 17A occurs when the handheld image scanner 10 is operated for scanning and consequently some distortion (displacement in the main scanning direction) occurs with the image data, the distortion can be eliminated to obtain image data of a high picture quality free from distortion. Accordingly, image data of a high quality free from distortion can be obtained without giving rise to an increase of the production cost.

Further, since a displacement amount in the main scanning direction is estimated based on a cross-correlation between line image data successively extracted in a spaced relationship from each other by a suitable distance d in the sub scanning direction, the amount of calculation for estimating displacement amounts in the main scanning direction can be reduced. Consequently, an image correction process can be performed efficiently and the accuracy in calculation of the displacement amount in the main scanning direction can be improved.

In this instance, the displacement amount of line image data of each line present between the lines of the line image data spaced from each other by the suitable distance is calculated by the linear interpolation processing section 111 which performs the linear interpolation processing based on the displacement amount in the main scanning direction, and the image data are corrected based on results of such linear interpolation. Consequently, the displacement amount in the main scanning direction estimated for the lines spaced by the suitable distance d from each other is allocated linearly to the line image data of the intermediate lines, and accordingly, correction of the image data is performed smoothly.

[2] Second Embodiment of the Invention

Figure 5:
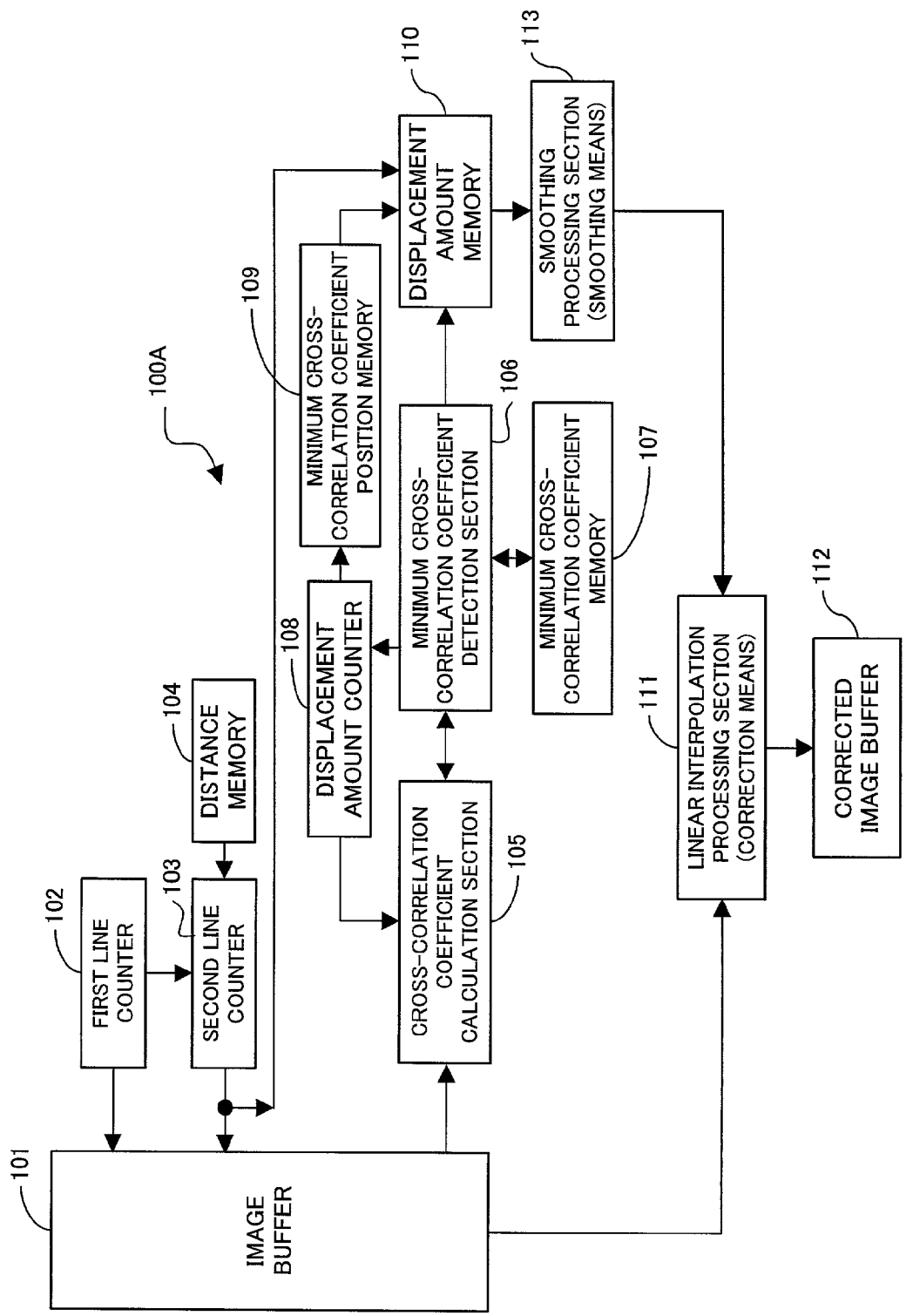
FIG. 5 is a block diagram showing a configuration of an image processing apparatus according to a second embodiment of the present invention.

FIG. 5 is a block diagram showing a configuration of an image processing apparatus according to a second embodiment of the present invention. Referring to FIG. 5, the image processing apparatus 100A of the second embodiment is a modification to and has a substantially similar configuration to that of the image processing apparatus 100 of the first embodiment. However, the image processing apparatus 100A is different from the image processing apparatus 100 in that it additionally includes a smoothing processing section 113.

The smoothing processing section (smoothing means) 113 added newly in the image processing apparatus 100A is interposed between the displacement amount memory 110 and the linear interpolation processing section 111, and performs a smoothing process for a displacement amount in the main scanning direction estimated for two lines spaced from each other by the predetermined distance d in step S15 described above (refer to FIG. 2) and stored in the displacement amount memory 110 so that the displacement amount in the main scanning direction may vary along a smooth curve and outputs the smoothed displacement amount in the main scanning direction to the linear interpolation processing section 111. It is to be noted that also the image processing apparatus 100A of the second embodiment is implemented by an information processing apparatus such as, for example, a personal computer similarly as in the first embodiment, and the function of the smoothing processing section 113 described above is implemented by a CPU in the information processing apparatus executing an image processing program.

Also the image processing apparatus 100A of the second embodiment having the configuration described above operates similarly to the image processing apparatus 100 of the first embodiment described hereinabove. In the second embodiment, however, a smoothing process is performed by the smoothing processing section 113 for estimated displacement amounts in the main scanning direction, and linear interpolation and correction are performed based on the smoothed displacement amounts in the main scanning direction by the linear interpolation processing section 111.

Figure 6A:
FIGS. 6A and 6B are schematic views illustrating a smoothing process of the image processing apparatus of FIG. 5.
Figure 6B:

Now, the smoothing process in the second embodiment is described with reference to FIGS. 6A and 6B. It is to be noted that the displacement amounts in the main scanning direction stored in the displacement amount memory 110 are displacement amounts between lines spaced by a predetermined distance from each other and each has one of the values of "−1", "0" and "1". FIG. 6A illustrates a result of displacement amount estimation when a plurality of displacement amounts in the main scanning direction stored in the displacement amount memory 110 are successively integrated to determine a displacement amount in the main scanning direction with respect to the original image (i.e., to determine a movement of the image scanner 10) and results of such integration are illustrated in a corresponding relationship to the positions in the sub scanning direction. FIG. 6B illustrates a result of the smoothing process performed by the smoothing processing section 113 for the displacement amount in the main scanning direction illustrated in FIG. 6A.

An actually calculated estimation result of the displacement amount in the main scanning direction in most cases exhibits a curve having small concave and convex portions as seen in FIG. 6A. According to an actual scanning operation, however, such concave and convex portions do not appear very frequently, and in most cases, they are caused by an influence of the image.

Therefore, in the image processing apparatus 100A, such an estimation result as shown in FIG. 6A is modified by the smoothing processing section 113 so as to be present along such a smooth curve as seen in FIG. 6B, and linear interpolation and correction are performed using a result of the modification. For the smoothing, various popular techniques can be used such as, for example, a method which uses a moving average, another method which uses a Bezier curve and a further method which uses approximation with a quadratic function.

In this manner, with the image processing apparatus 100A according to the second embodiment of the present invention, similar advantages to those of the first embodiment can be anticipated. Further, since linear interpolation and correction by the linear interpolation processing section 111 are performed after a smoothing process is performed for estimated displacement amounts in the main scanning direction so that the displacement amounts in the main scanning direction may be present along a smooth curve, a sharp displacement of image data which arises from a sharp movement of the image scanner 10 can be eliminated appropriately. Consequently, image data of a higher picture quality can be obtained.

[3] Third Embodiment of the Invention

Figure 7:
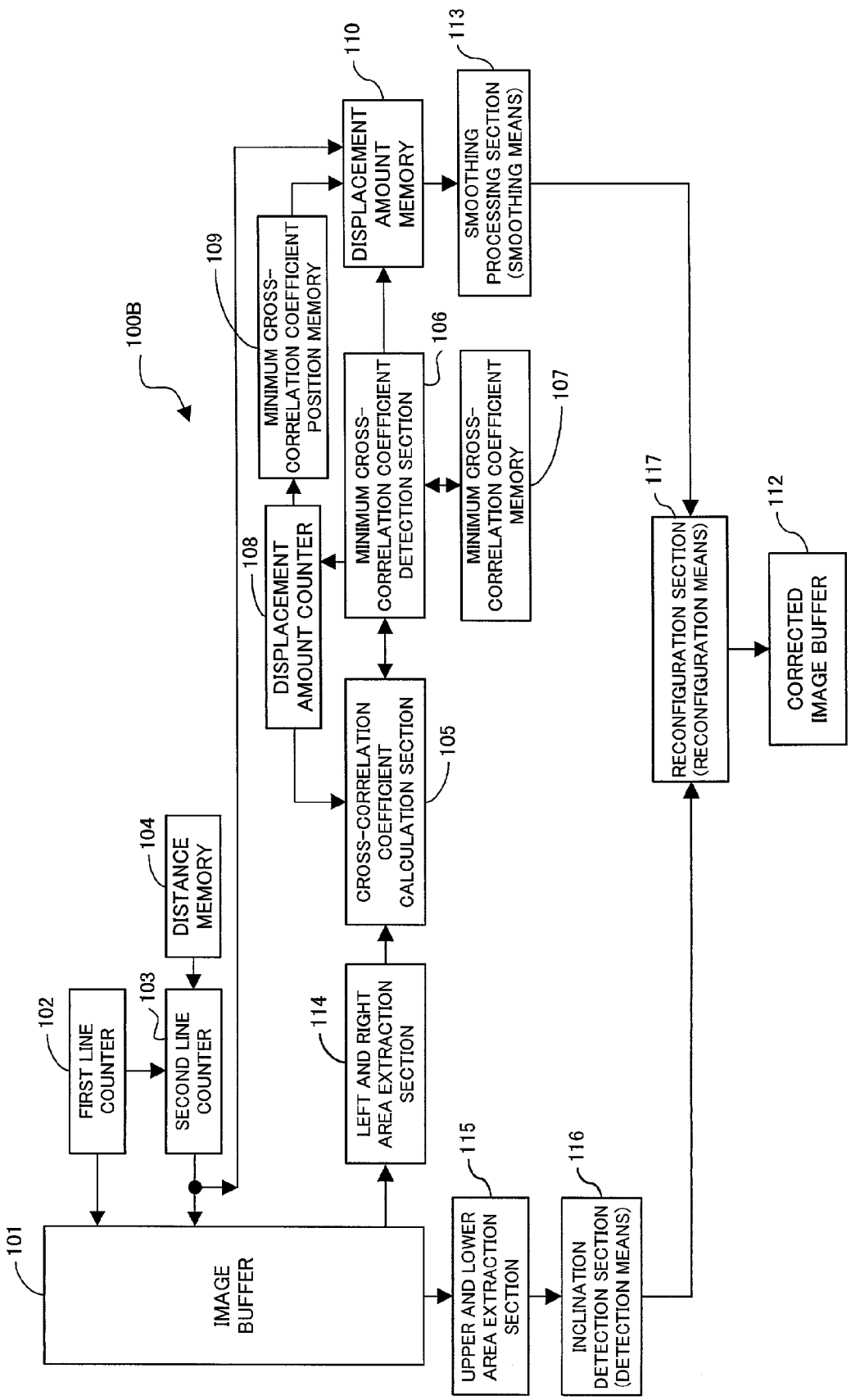
FIG. 7 is a block diagram showing a configuration of an image processing apparatus according to a third embodiment of the present invention.

FIG. 7 is a block diagram showing a configuration of an image processing apparatus according to a third embodiment of the present invention. Referring to FIG. 7, the image processing apparatus 100B of the third embodiment is a modification to and has a substantially similar configuration to that of the image processing apparatus 100A of the second embodiment. However, the image processing apparatus 100B is different from the image processing apparatus 100A in that it additionally includes a left and right area extraction section 114, an upper and lower area extraction section 115 and an inclination detection section 116 and includes a reconfiguration section 117 in place of the linear interpolation processing section 111. Also in the present embodiment, when merely the term "displacement amount" is used, the "displacement amount" is a displacement amount in the main scanning direction.

Figure 9:
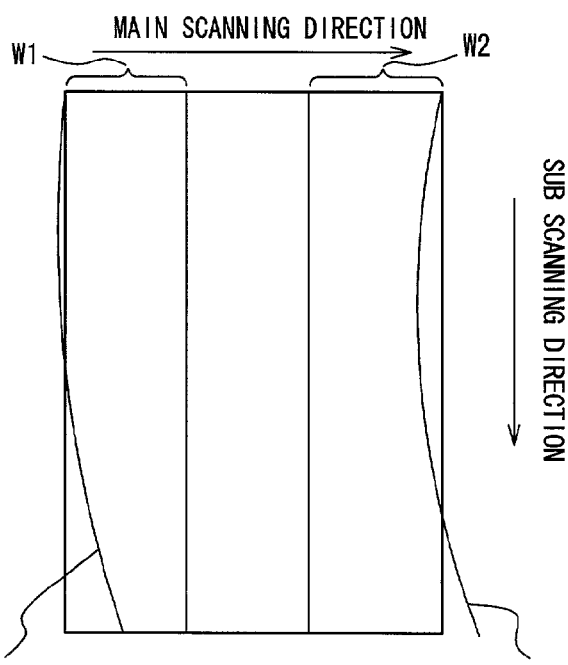

The left and right area extraction section 114 extracts a left side area and a right side area of image data from the image buffer 101 in order to estimate displacement amounts on the opposite left and right sides of the image data as hereinafter described with reference to FIG. 9. More particularly, the left and right area extraction section 114 divides entire image data into three parts in the main scanning direction as seen in FIG. 9 and extracts a left side area W1 and a right side area W2.

The left and right area extraction section 114 forms estimation means together with the first line counter 102, second line counter 103, distance memory 104, cross-correlation coefficient calculation section 105, minimum cross-correlation coefficient detection section 106, minimum cross-correlation coefficient memory 107, displacement amount counter 108 and minimum cross-correlation coefficient position memory 109 described hereinabove. The estimation means in the third embodiment estimates displacement amounts in the main scanning direction of the left side and the right side of image data based on a cross-correction between part data which form a plurality of lines of line image data, that is, a cross-correlation between data belonging to the left side area W1 and the right side area W2. In other words, in the third embodiment, the displacement amount estimation (refer to FIG. 3) described hereinabove in connection with the first embodiment is applied to each of the left side area W1 and right side area W2 extracted by the left and right area extraction section 114, and a displacement amount between the opposite left and right sides of line image data is estimated for two lines spaced by a suitable predetermined distance d in the sub scanning direction. Then, a result of the estimation is stored into the displacement amount memory 110.

Figure 10:
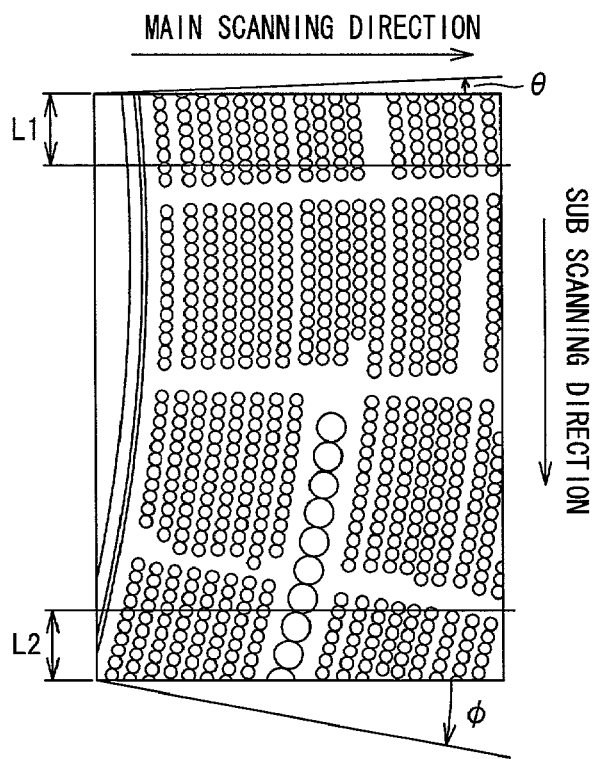

The upper and lower area extraction section 115 extracts an upper side area and a lower side area of image data from the image buffer 101 in order to detect inclinations of an image (actually a character line) on the opposite upper and lower sides of the image data as hereinafter described with reference to FIG. 10. More particularly, the upper and lower area extraction section 115 extracts an upper side area L1 and a lower side area L2 having a suitable width (vertical dimension in FIG. 10) as seen in FIG. 10.

The inclination detection section (detection means) 116 detects inclinations of an image on the opposite upper and lower sides of image data based on an upper side area L1 and an lower side area L2 extracted by the upper and lower area extraction section 115. In the third embodiment, it is assumed that image data represent a document image, and the inclination detection section 116 detects inclinations of an image on the opposite upper and lower sides based on an inclination of a character line which composes the document image. Thereupon, the technique disclosed in Japanese Patent Laid-Open No. 341259/1999 is used as hereinafter described with reference to FIGS. 10, 15A and 15B.

The reconfiguration section (reconfiguration means) 117 reconfigures image data of the image buffer 101 based on displacement amounts of the opposite left and right sides estimated in such a manner as described above and stored in the displacement amount memory 110 and inclinations of the opposite upper and lower sides detected in such a manner as described above by the inclination detection section 116 to eliminate distortion of the image data and then writes the image data after the correction into the corrected image buffer 112.

The smoothing processing section 113 in the third embodiment performs a smoothing process for displacement amounts in the displacement amount memory 110 using a Bezier curve and outputs the smoothed displacement amounts to the reconfiguration section 117 similarly as in the second embodiment. The reconfiguration section 117 performs reconfiguration of image data using a parameter t of the Bezier curves (displacement amounts) of the opposite left and right sides obtained by the smoothing processing section 113 as hereinafter described with reference to FIGS. 11 to 14.

It is to be noted that also the image processing apparatus 100B of the third embodiment is implemented by an information processing apparatus such as, for example, a personal computer similarly as in the first and second embodiments, and the functions of the left and right area extraction section 114, upper and lower area extraction section 115, inclination detection section 116 and reconfiguration section 117 described above are implemented by a CPU in the information processing apparatus executing a predetermined image processing program.

Figure 14:
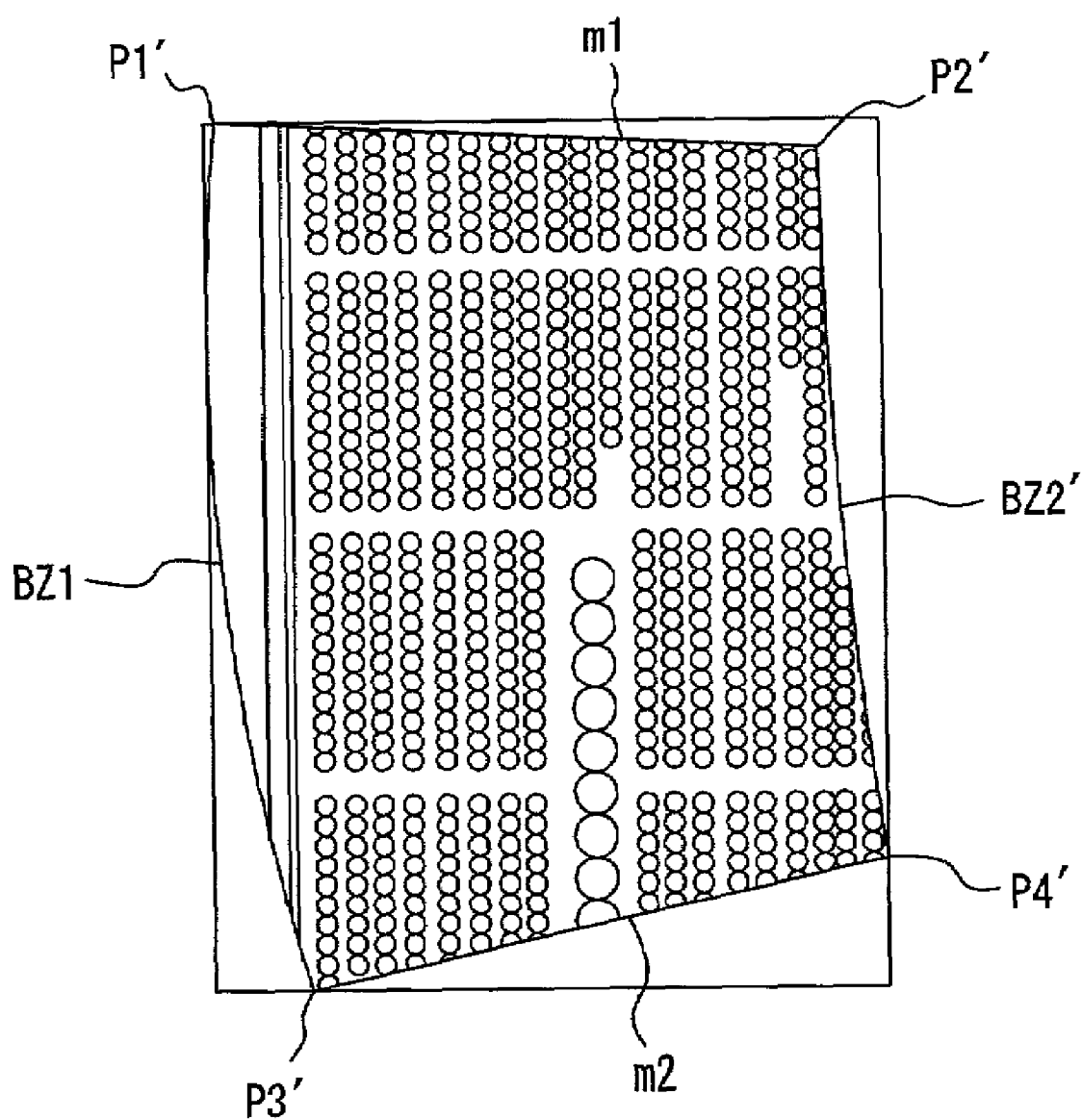
Figure 15A:
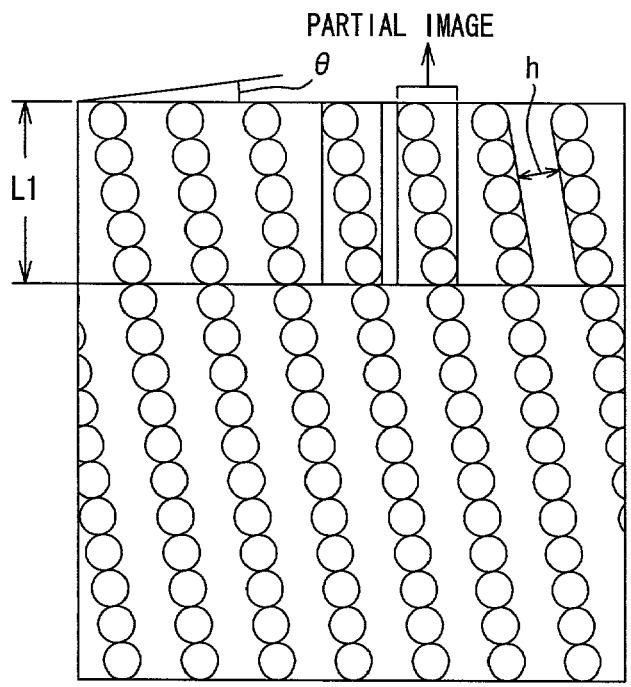
FIGS. 15A and 15B are schematic views illustrating a technique for detecting an inclination of an image by the image processing apparatus of FIG. 7.
Figure 15B:
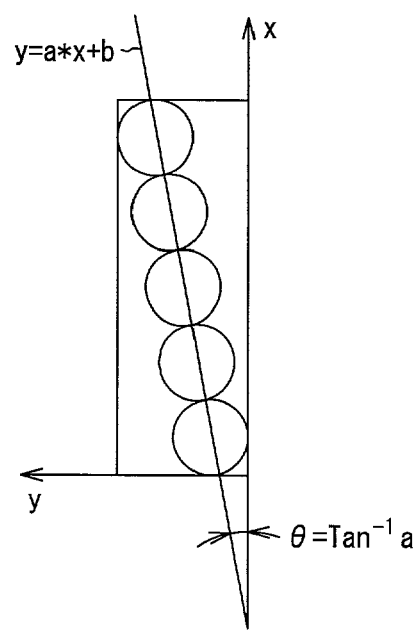

Now, operation of the image processing apparatus 100B according to the third embodiment described above is described with reference to FIGS. 8 to 15B. It is to be noted that FIGS. 8 to 14 illustrate an image processing technique of the image processing apparatus of the third embodiment, and FIGS. 15A and 15B illustrate a technique for detecting an inclination of an image in the third embodiment.

Figure 8:
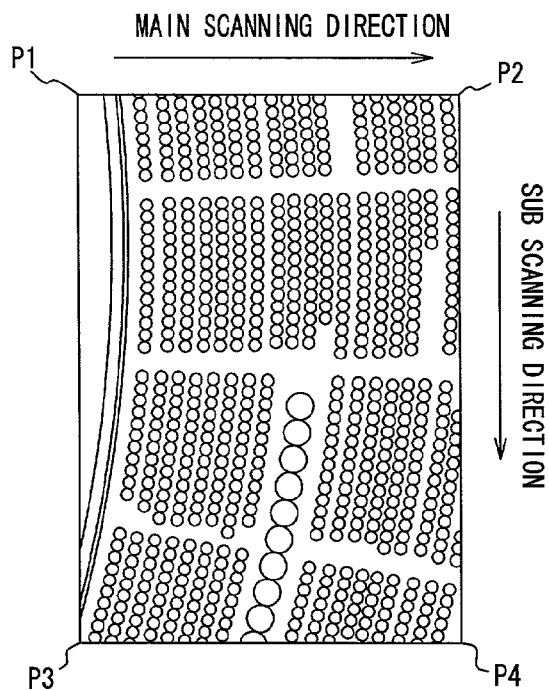
FIGS. 8 to 14 are schematic views illustrating an image processing technique of the image processing apparatus of FIG. 7.
Figure 11:
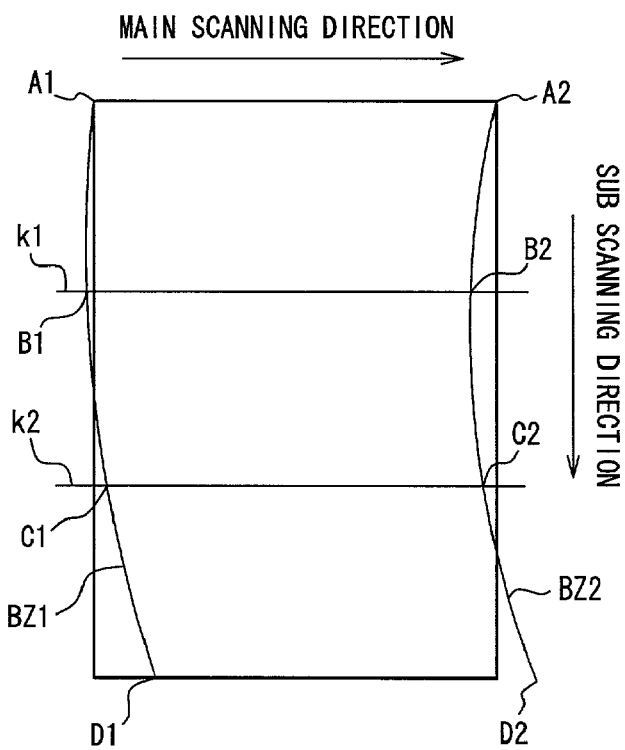
Figure 12:
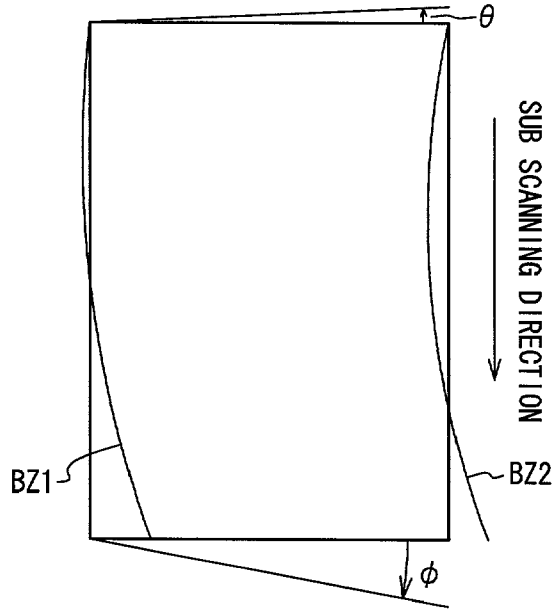

Here, operation of the image processing apparatus 100B where image data (an original image) obtained by such a handheld image scanner 10 as shown in FIG. 16 and stored in the image buffer 101 represent, for example, such a document image (vertical writing) as shown in FIG. 8 and correction processing by the image processing apparatus 100B is performed for the document image is described. FIG. 8 illustrates image data (representing a rectangular image having apexes P1 to P4) suffering from two-dimensional distortion. The two-dimensional distortion appears because, for example, the image scanner 10 during scanning operation slips relative to a reading object original and consequently the image scanner 10 scans a sectoral area. It is to be noted that the mark "○" in FIGS. 8, 10, 14, 15A and 15B represents a character. Further, in FIGS. 9, 11 and 12, representation of characters by "○" is omitted to facilitate illustration.

First, displacement amounts of the opposite left and right sides of the image data are estimated. In particular, the displacement amount estimation described hereinabove in connection with the first embodiment (refer to FIG. 3) is applied to the left side area W1 and right side area W2 of the image data extracted by the left and right area extraction section 114 as seen in FIG. 9. Consequently, the displacement amounts of the opposite left and right sides of the line image data are estimated for lines spaced from each other by the suitable predetermined distance d in the sub scanning direction, and estimation results R1 and R2 then are stored into the displacement amount memory 110 (estimation step).

It is to be noted that each of the displacement amounts of the opposite left and right sides stored in the displacement amount memory 110 is a displacement amount between lines spaced by the predetermined distance from each other and has one of the values "−1", "0" and "1". The displacement amount estimation results R1 and R2 in FIG. 9 are obtained by successively integrating displacement amounts of the left and right sides in the main scanning direction stored in the displacement amount memory 110 to determine a displacement amount in the main scanning direction with respect to the original image (i.e. to determine a movement of the image scanner 10) and illustrating results of such integration in a corresponding relationship to the positions in the sub scanning direction, similarly as in the case of FIG. 6A.

Then, inclinations of the image in the upper and lower areas of the image data are detected by the upper and lower area extraction section 115 and the inclination detection section 116. In particular, the inclination detection section 116 uses the image data (character line image) in the upper and lower side areas L1 and L2 extracted by the upper and lower area extraction section 115 to detect inclination angles $\theta$ and $\phi$ of the upper and lower image portions as seen in FIG. 10 (detection step). The inclination angle $\theta$ corresponds to an angle defined by the image scanner 10 and a pertaining character line upon starting of a scanning operation of the image scanner 10 while the inclination angle $\phi$ corresponds to an angle defined by the image scanner 10 and a pertaining character line upon ending of the scanning operation of the image scanner 10.

Here, a technique for detecting the upper side inclination angle $\theta$ by means of the inclination detection section 116 is described with reference to FIGS. 15A and 15B. This inclination detection technique is disclosed in Japanese Patent Laid-Open No. 341259/1999.

In particular, the inclination detection section 116 extracts a character train for one line (in FIG. 15A, five successive characters) as a partial image from the upper side area L1 as seen in FIG. 15A. The partial image is cut out as a rectangle which circumscribes with the character train and has sides parallel to each other in the main scanning direction and the sub scanning direction of the image data. The x axis and the y axis for the partial image cut out in this manner are set in such a manner as seen in FIG. 15B and coordinates of black pixels which form the characters in the partial image are approximated with a straight line (refer to a straight line $y=a*x+b$ in FIG. 15B). The inclination "a" of the straight line can be calculated, for example, as an inclination of a regression line of the black pixel coordinates in accordance with the following expression (2):

$$a=(N\Sigma x_i y_i - \Sigma x_i \Sigma y_i)/N\Sigma x_i^2-(\Sigma x_i)^2) \quad (2)$$

where "$\Sigma$" represents the totaling calculation from i=0 to N-1, N the number of black pixels in the partial image, and $x_i$ and $y_i$ represent the x coordinate and the y coordinate of the ith black pixel, respectively. The upper side inclination angle $\theta$ is calculated based on the inclination "a" obtained using the expression (2) above in accordance with the following expression (3). Also the lower side inclination angle $\phi$ is calculated in a similar manner.

$$\theta = \text{Tan}^{-1} a \quad (3)$$

Thus, as an inclination of the image, the inclination angles $\theta$ and $\phi$ of character trains, that is, angles defined by the image scanner 10 with respect to character trains, are calculated.

It is to be noted that, if only one partial image is used for calculation of an inclination angle, then a correct inclination angle may not possibly be determined from an influence of an error of straight line approximation and so forth. Therefore, it is preferable to extract a plurality of partial images from within each of the upper and lower side areas L1 and L2 and calculate the inclination angle using the expressions (2) and (3) for each of the partial images. In this instance, effective ones of the plurality of inclination angles calculated in this manner are extracted, and an average value of the extracted effective inclination angles is decided as a final inclination angle $\theta$ or $\phi$.

Thereafter, the smoothing processing section 113 performs a smooth process using a Bezier curve for the displacement amount estimation results R1 and R2 obtained in such a manner as seen in FIG. 9, and consequently, such Bezier curves BZ1 and BZ2 as shown in FIG. 11 are obtained, respectively. Thus, the movements of the opposite ends of the image scanner 10 (line sensor 11) are approximated with the Bezier curves (smoothing step).

A Bezier curve is represented generally by the following expression (4):

$$r(t)=A*(1-t)^3+3*B*t*(1-t)^2+3*C*t^2*(1-t)+D*t^3 \quad (4)$$

where A, B, C and D are vector constants, and t is a parameter. It is to be noted that, in FIG. 11, the vector constants A, B, C and D of the Bezier curve BZ1 with which the estimation result R1 of the left side is approximated are denoted by A1, B1, C1 and D1, respectively, and the vector constants A, B, C and D of the Bezier curve BZ2 with which the estimation result R2 of the right side is approximated are denoted by A2, B2, C2 and D2, respectively.

The vector constants A1 and A2 are given as vectors representative of two apexes P1 and P2 (refer to FIG. 8) of the image data, respectively. Meanwhile, the vectors D (D1 and D2) are given as vectors representative of lowermost points of the estimation results R1 and R2 obtained in such a manner as seen in FIG. 9, respectively.

In order to determine the Bezier curves, it is necessary to determine two control points B (B1 and B2) and C (C1 and C2) between the vectors A and D. It is assumed now that an estimation result of the displacement amount at a position k1 of ⅓ the image length in the sub scanning direction from the top end is represented by h1 and an estimation result of the displacement amount at another position k2 of ⅔ the image length in the sub scanning direction from the top end is represented by h2. In this instance, the control points B and C are given from the definition of a Bezier curve by the following expressions (5) and (6), respectively:

$$B=(18.0*h1-9.0*h2-5.0*A+2.0*D)/2.0 \quad (5)$$

$$C=(18.0*h2-9.0*h1-5.0*D+2.0*A)/2.0 \quad (6)$$

Since the vector coefficients A, B, C and D are determined in such a manner as described above, the Bezier curves BZ1 and BZ2 with which the estimation results R1 and R2 are approximated, respectively, are given hereinabove by the expression (4), and the displacement amounts of the opposite upper and lower sides are smoothed and the movements of the opposite left and right ends of the image scanner 10 can be estimated.

By the processing described above, the Bezier curves BZ1 and BZ2 representative of the displacement amounts of the opposite left and right sides of the image data and the inclination angles $\theta$ and $\phi$ of the image at the upper and lower portions of the image data are obtained.

Then, in the reconfiguration section 117, the shape of the area (refer to FIG. 13) actually scanned by the image scanner 10 is reconfigured based on the Bezier curves BZ1 and BZ2 and the inclination angles $\theta$ and $\phi$, and the image data illustrated in FIG. 8 are re-arranged in the reconfigured area. Consequently, such reconfigured image data (corrected image data) as illustrated in FIG. 14 are finally stored into the corrected image buffer 112 (reconfiguration step).

Figure 13:
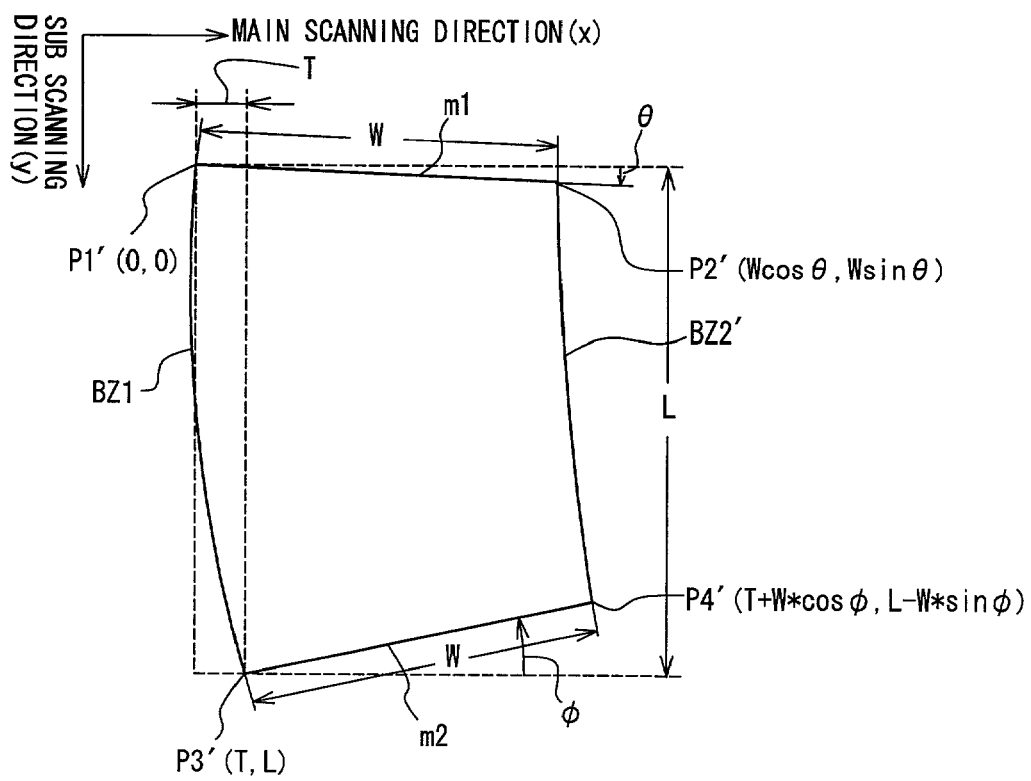

The shape of the area actually scanned by the image scanner 10 is reconfigured in such a manner as seen in FIG. 13 based on the Bezier curves BZ1 and BZ2 and the inclination angles $\theta$ and $\phi$. Here, the reading width and the reading length (image length in the sub scanning direction) of the image scanner 10 are represented by W and L, respectively. The reading width W is physically fixed and has a fixed value. Meanwhile, the reading length L is determined from the number of lines read by the image scanner 10.

As shown in FIG. 13, the position of the image scanner 10 upon starting of reading is given as a straight line m1 based on the upper side inclination angle $\theta$. The length of the straight line m1 has the fixed reading width W. The straight line m1 and the Bezier curve BZ1 are placed one on the other with the left end of the straight line m1 registered with the upper end of the left side Bezier curve BZ1. Then, the Bezier curve BZ1 and another straight line m2, which has the inclination angle $\phi$ with respect to the main scanning direction and has the reading width W, are placed one on the other with the lower end of the Bezier curve BZ1 registered with the left end of the straight line m2. The straight line m2 represents the position of the image scanner 10 when the reading of the image scanner 10 comes to an end. Finally, the Bezier curve BZ2 is reduced in accordance with the distance between the right end of the straight line m1 and the right end of the straight line m2 to obtain a Bezier curve BZ2', and the Bezier curve BZ2' is placed between the right end of the straight line m1 and the right end of the straight line m2. The area actually scanned by the image scanner 10 is reconfigured in such a manner as just described.

In the example illustrated in FIG. 13, since the amount of movement (displacement width) on the left side is greater than the amount of movement (displacement width) on the right side, the scanning area is reconfigured with reference to the left side. Then, if, as seen in FIG. 13, a coordinate system wherein the x axis is the main scanning direction while the y axis is the sub scanning direction and the left upper apex P1' of the reconfigured region is determined as the origin (0, 0) and the displacement amount between the upper end and the lower end of the left side Bezier curve BZ1 is represented by T, the coordinates of the other three apexes P2', P3' and P4' of the reconfigured area are given by (W*cos θ, W*sin θ), (T, L) and (T+W*cos φ, L−W*sin φ), respectively.

Then, the image data illustrated in FIG. 8 are reconfigured in the area reconfigured in such a manner as seen in FIG. 13 thereby to reconfigure the image as seen in FIG. 14. Naturally, the four apexes P1, P2, P3 and P4 of the image data illustrated in FIG. 8 correspond to the four apexes P1', P2', P3' and P4' of the reconfigured area, respectively.

Then, reconfiguration of the image data is performed using the parameter t of the Bezier curves BZ1 and BZ2' on the opposite left and right sides. The Bezier curves BZ1 and BZ2' are functions which use the parameter t as described above, and when t=0, the Bezier curves BZ1 and BZ2' coincide with the vectors A (A1 and A2), but when t=1, the Bezier curves BZ1 and BZ2' coincide with the vectors D (D1 and D2).

Thus, reconfiguration of pixels is performed using a parameter obtained by dividing the range from 0 to 1 by a line number NL corresponding to the reading length L in the sub scanning direction. In particular, in order to re-arrange the jth line in FIG. 8 in the reconfigured area shown in FIG. 13, the parameter t is set to j/NL and substituted into the Bezier curves BZ1 and BZ2' to obtain two points. The two points thus obtained represent the positions of the opposite ends of the jth line after the re-arrangement. Then, the pixels on the jth lines are re-arranged on a straight line interconnecting the two points.

An image obtained by such reconfiguration as described above may possibly suffer from a miss of some image data. If a miss of pixel data occurs, then an average value of pixels around the missing pixel data is determined and used as pixel data at the portion.

The image data of the image buffer 101 are reconfigured as seen in FIG. 14 in such a manner as described above, and the distortion of the image data is eliminated. The image data after the correction are written into the corrected image buffer 112.

It is to be noted that, while, in the present embodiment, the control points are placed at the ⅓ position and the ⅔ position of the length of the image in the sub scanning direction from the top of the image, the positions of the control points are not limited to the specific positions.

Figure 17B:
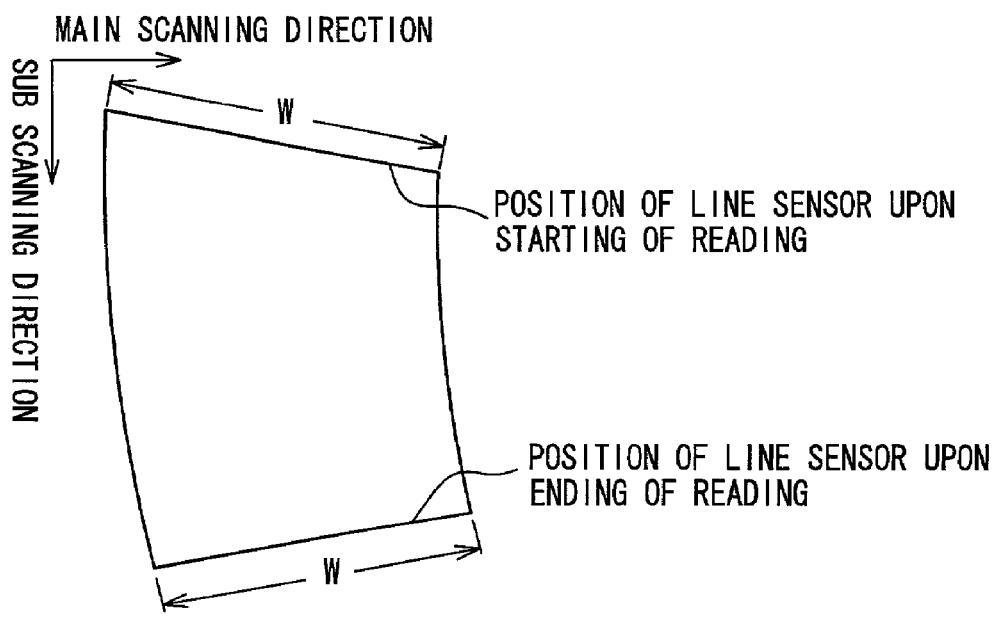

In this manner, with the image processing apparatus 100B of the third embodiment of the present invention, it is possible to use only read image data to correct two-dimensional distortion of the image data without using a two-dimensional sensor. For example, even if such a two-dimensional slip as seen in FIG. 17B occurs when the handheld image scanner 10 is operated for scanning and consequently such distortion as illustrated in FIG. 8 occurs with the image data, the distortion can be eliminated to obtain image data of a high picture quality free from distortion. Accordingly, image data of a high quality free from distortion can be obtained without giving rise to an increase of the production cost.

Further, since line image data are successively extracted in a spaced relationship from each other by a suitable distance (5 to 20 lines) d in the sub scanning direction from the image data in the left side image data area and the right side image data area and displacement amounts on the left side and the right side are estimated based on a cross-correlation between the extracted line image data, the amount of calculation for estimating displacement amounts in the main scanning direction can be reduced. Consequently, an image correction process can be performed efficiently and the accuracy in calculation of the displacement amount in the main scanning direction can be improved.

Further, since reconfiguration of an image is performed after a smoothing process is performed for displacement amounts in the main scanning direction, a sharp displacement of image data which arises from a sharp movement of the image scanner 10 can be eliminated appropriately. Consequently, image data of a higher picture quality can be obtained. Besides, since a Bezier curve [refer to the expression (4) given hereinabove] is used for the smoothing process in this instance, the reconfiguration of image data can be performed readily using the parameter t of the Bezier curve.

Furthermore, according to the third embodiment, the inclination angles θ and φ of the image on the opposite upper and lower sides of the image data can be determined readily based on inclinations of character trains which form the document image of the image data.

[4] Fourth Embodiment of the Invention

Figure 18:
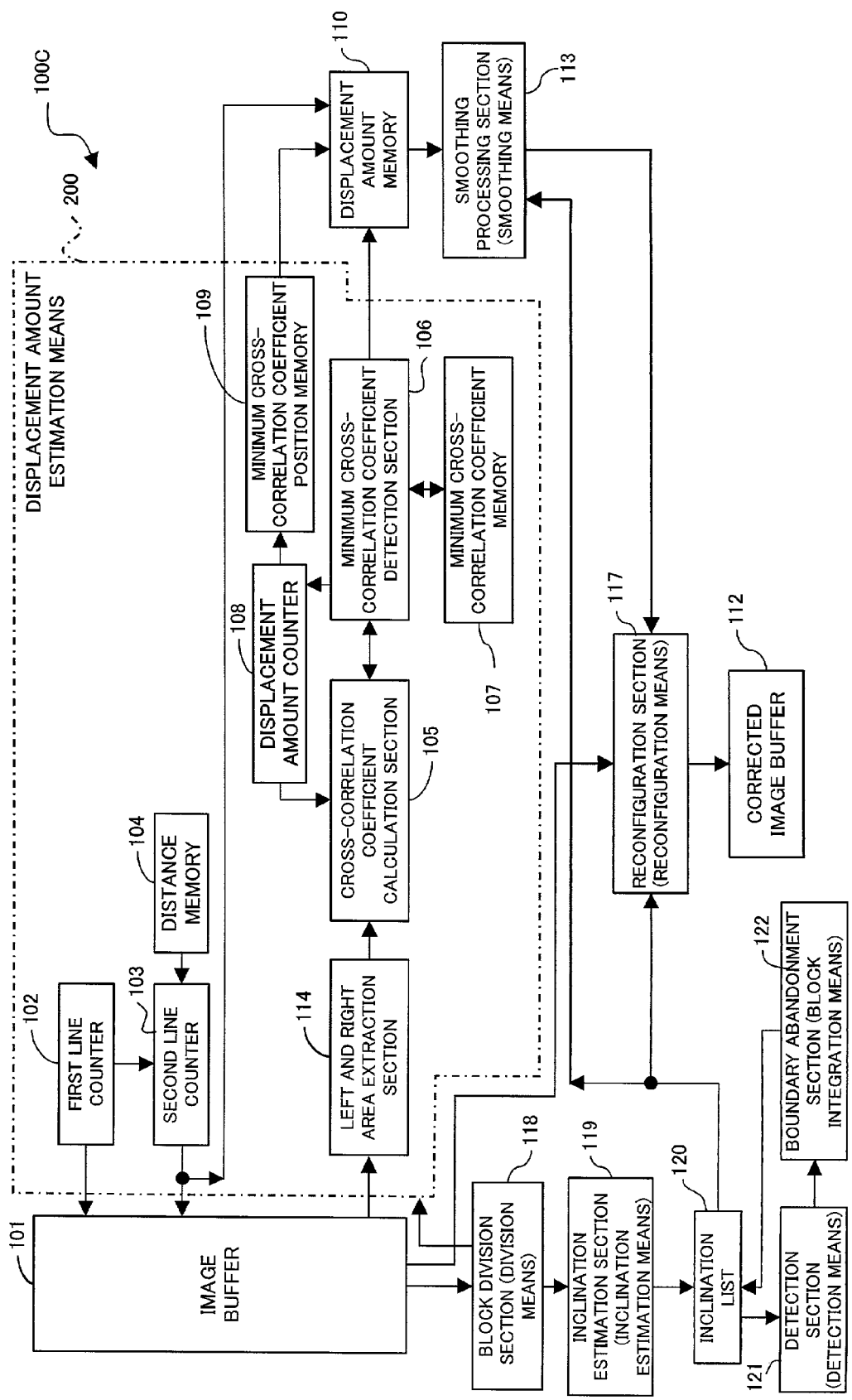
FIG. 18 is a block diagram showing a configuration of an image processing apparatus according to a fourth embodiment of the present invention.

FIG. 18 is a block diagram showing a configuration of an image processing apparatus according to a fourth embodiment of the present invention. Referring to FIG. 18, the image processing apparatus 100C of the fourth embodiment is a modification to and has a substantially similar configuration to that of the image processing apparatus 100B of the third embodiment. However, the image processing apparatus 100C is different from the image processing apparatus 100B in that it includes a block division section 118, an inclination estimation section 119, an inclination list 120, a detection section 121 and a boundary abandonment section 122 in place of the upper and lower area extraction section 115 and the inclination detection section 116. It is to be noted that, also in the present embodiment, when merely the term "displacement amount" is used, the "displacement amount" signifies a displacement amount in the main scanning direction.

The block division section (division means) 118 divides image data stored in the image buffer 101 into a plurality of blocks (refer to, for example, reference characters BL1 to BL4 of FIG. 20) in the sub scanning direction (upward and downward direction) in accordance with a division number designated in advance (in the fourth embodiment, four or five).

The inclination estimation section (inclination estimation means) 119 estimates inclinations of the image on the opposite upper and lower sides of each of the blocks obtained by the division by the block division section 118.

In particular, the inclination estimation section 119 estimates an inclination of the image on the boundary (refer to, for example, reference characters b1 to b3 of FIG. 20) between each two adjacent ones of the plurality of blocks (refer to, for example, reference characters BL1 to BL4 of FIG. 20) as an inclination of the boundary based on the image data which are included in the areas on the opposite sides of the boundary (refer to, for example, reference characters BLR1 to BLR3 of FIG. 20), and registers such estimated inclinations into the inclination list 120. The inclinations of the boundaries estimated in this manner (boundary bi: i=1, 2, 3) are each adopted as an estimation result of an inclination of the image on the lower side of the upper side one (block BLi) of the two blocks and an inclination of the image on the upper side of the lower side one (block BLi+1) of the two blocks.

Further, the inclination estimation section 119 estimates an inclination of the image of the upper side of the uppermost block (refer to reference character BL1 of FIG. 20) as an inclination of the boundary of the top portion, that is, the upper side boundary (refer to reference character b0 of FIG. 20) of the uppermost block based on the image data which are included in the upper side area (refer to, for example, reference character BLR0 of FIG. 20) of the image data. Furthermore, the inclination estimation section 119 estimates an inclination of the image of the lower side of the lowermost block (refer to reference character BL4 of FIG. 20) as an inclination of the boundary of the bottom portion, that is, the lower side boundary (refer to reference character b4 of FIG. 20) of the lowermost block based on the image data which are included in the lower side area (refer to, for example, reference character BLR4 of FIG. 20) of the image data.

It is to be noted that, also in the fourth embodiment, it is assumed that image data represent a document image similarly as in the third embodiment, and the inclination estimation section 119 estimates inclinations of an image on the opposite upper and lower sides of each of blocks based on an inclination of a character line which composes the document image. Thereupon, the technique disclosed in Japanese Patent Laid-Open No. 341259/1999 is used similarly as in the third embodiment. The inclination estimation method by the inclination estimation section 119 is hereinafter described with reference to FIG. 20.

The inclination list 120 stores the inclinations of the boundaries estimated by the inclination estimation section 119 in such a manner as described above in a coordinated relationship with identification information with which the boundaries can be specified individually.

The detection section (detection means) 121 detects, based on the inclinations of the boundaries stored in the inclination list 120, a boundary which forms an angle greater than a predetermined angle with respect to another directly neighboring boundary or another boundary which intersects with another boundary in the image area as a boundary whose inclination has been estimated in error. It is to be noted that a particular example of a boundary whose inclination has been estimated in error is hereinafter described with reference to FIGS. 21 and 22.

The boundary abandonment section (block integration means) 122 integrates two blocks on the opposite sides of a boundary detected by the detection section 121 into a single block. In the present embodiment, the boundary abandonment section 122 deletes or abandons the inclination corresponding to the boundary (whose inclination has been estimated in error) detected by the detection section 121 from within the inclination list 120 to integrate the two blocks on the opposite sides of the boundary into a single block. Further, in the present embodiment, based on the inclination list 120 from which an erroneous inclination or inclinations have been abandoned in such a manner as described above, that is, based on the blocks after such integration, a displacement amount estimation means 200 and the reconfiguration section 117 execute the estimation process and the reconfiguration process, respectively.

The displacement amount estimation means 200 is formed from, similarly to the estimation means of the third embodiment, the first line counter 102, second line counter 103, distance memory 104, cross-correlation coefficient calculation section 105, minimum cross-correlation coefficient detection section 106, minimum cross-correlation coefficient memory 107, displacement amount counter 108, minimum cross-correlation coefficient position memory 109 and left and right area extraction section 114 described hereinabove. Also the displacement amount estimation means 200 in the fourth embodiment performs basically similar functions to those of the estimation means in the third embodiment. In the fourth embodiment, however, the displacement amount estimation means 200 estimates displacement amounts in the main scanning direction of the left side and the right side of each of the blocks BLi obtained by division by the block division section 118 based on a cross-correlation between part data which form line image data in the block BLi, that is, cross-correlations between data which belong to the left side area W1 and the right side area W2 (refer to FIG. 9).

In particular, the displacement amount estimation means 200 in the fourth embodiment applies the displacement amount estimation (refer to FIG. 3) described hereinabove in connection with the first embodiment for each of the left and right side areas W1 and W2 extracted by the left and right area extraction section 114 for each of the blocks BLi, estimates the displacement amounts on the opposite left and right sides of line image data for lines spaced from each other by a suitable distance d (for example, a 5- to 20-line distance) in the sub scanning direction, and stores resulting values of the estimation into the displacement amount memory 110.

The smoothing processing section 113 in the fourth embodiment performs a smoothing process using a Bezier curve for the displacement amounts in the displacement amount memory 110 and outputs the smoothed displacement amounts to the reconfiguration section 117 similarly as in the third embodiment. The smoothing processing section 113 in the fourth embodiment determines, however, different from that in the third embodiment, control points to be used for determination of a Bezier curve, for each of the blocks BLi, taking the inclinations of the opposite upper and lower sides estimated by the inclination estimation section 119 and stored in the inclination list 120 into consideration as hereinafter described with reference to FIG. 23.

The reconfiguration section 117 performs reconfiguration of image data using a parameter t of the Bezier curves (displacement amounts) of the opposite left and right sides obtained by the smoothing processing section 113, similarly as in the third embodiment. However, the smoothing processing section 113 and the reconfiguration section 117 in the fourth embodiment perform the smoothing process and the reconfiguration process for each of the blocks BLi.

The reconfiguration section 117 in the fourth embodiment reconfigures, for each of the blocks BLi, image data in the block BLi in the image buffer 101 based on the displacement amounts (actually, the Bezier curves obtained by the smoothing processing section 113) of the opposite left and right sides estimated by the displacement amount estimation means 200 and stored in the displacement amount memory 110 and the inclinations of the opposite upper and lower sides estimated by the inclination estimation section 119 and stored in the inclination list 120 to eliminate the distortion of the image data in the block BLi and then write such image data of the blocks BLi after the correction into the corrected image buffer 112.

More particularly, the reconfiguration section 117 reconfigures, for each of the blocks BL1, the image data in the block BLi so that tangential lines in the sub scanning direction of the image regions at the left and right ends of the opposite upper and lower sides and the inclinations at the opposite upper and lower sides estimated by the inclination estimation section 119 may extend perpendicularly to each other as hereinafter described with reference to FIG. 24.

In this manner, the displacement amount estimation means 200, smoothing processing section 113 and reconfiguration means 117 in the fourth embodiment perform processes similar to those of the estimation means, smoothing processing section 113 and reconfiguration section 117 of the third embodiment, respectively, for the blocks BLi.

It is to be noted that also the image processing apparatus 100C of the fourth embodiment is implemented by an information processing apparatus such as, for example, a personal computer similarly as in the first to third embodiments, and the functions of the block division section 118, inclination estimation section 119, detection section 121, boundary abandonment section 122, displacement amount estimation means 200, smoothing processing section 113 and reconfiguration section 117 described above are implemented by a CPU in the information processing apparatus executing an image processing program. Further, the functions of the image buffer 101, inclination list, displacement amount memory 110 and corrected image buffer 112 are implemented by a memory (RAM, ROM, hard disk or the like) in the information processing apparatus.

Figure 19:
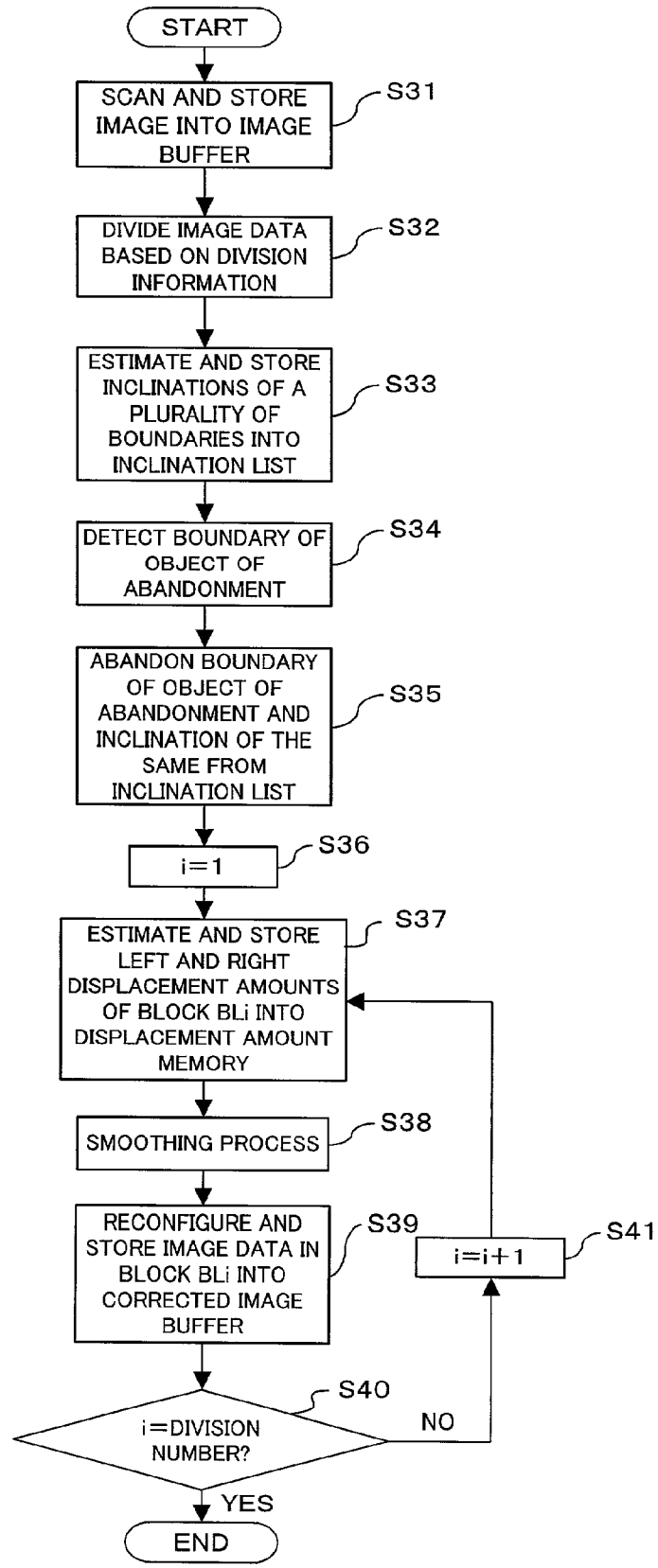
FIG. 19 is a flow chart illustrating an image processing procedure of the image processing apparatus of FIG. 18.
Figure 20:
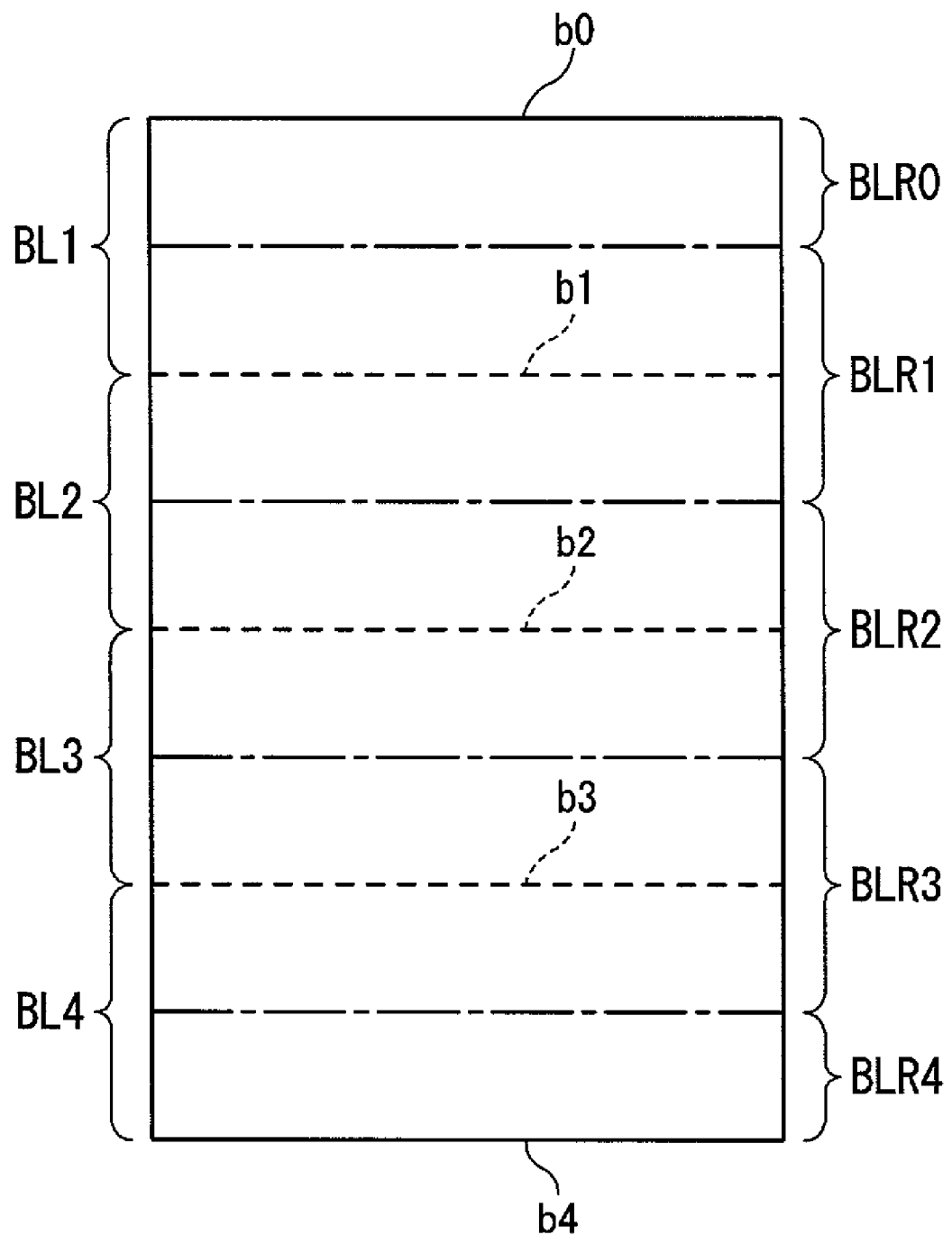
FIG. 20 is a schematic view illustrating a technique for estimating inclinations of an image (inclinations of the boundaries) of the opposite upper and lower sides of a block by the image processing apparatus of FIG. 18.
Figure 21:
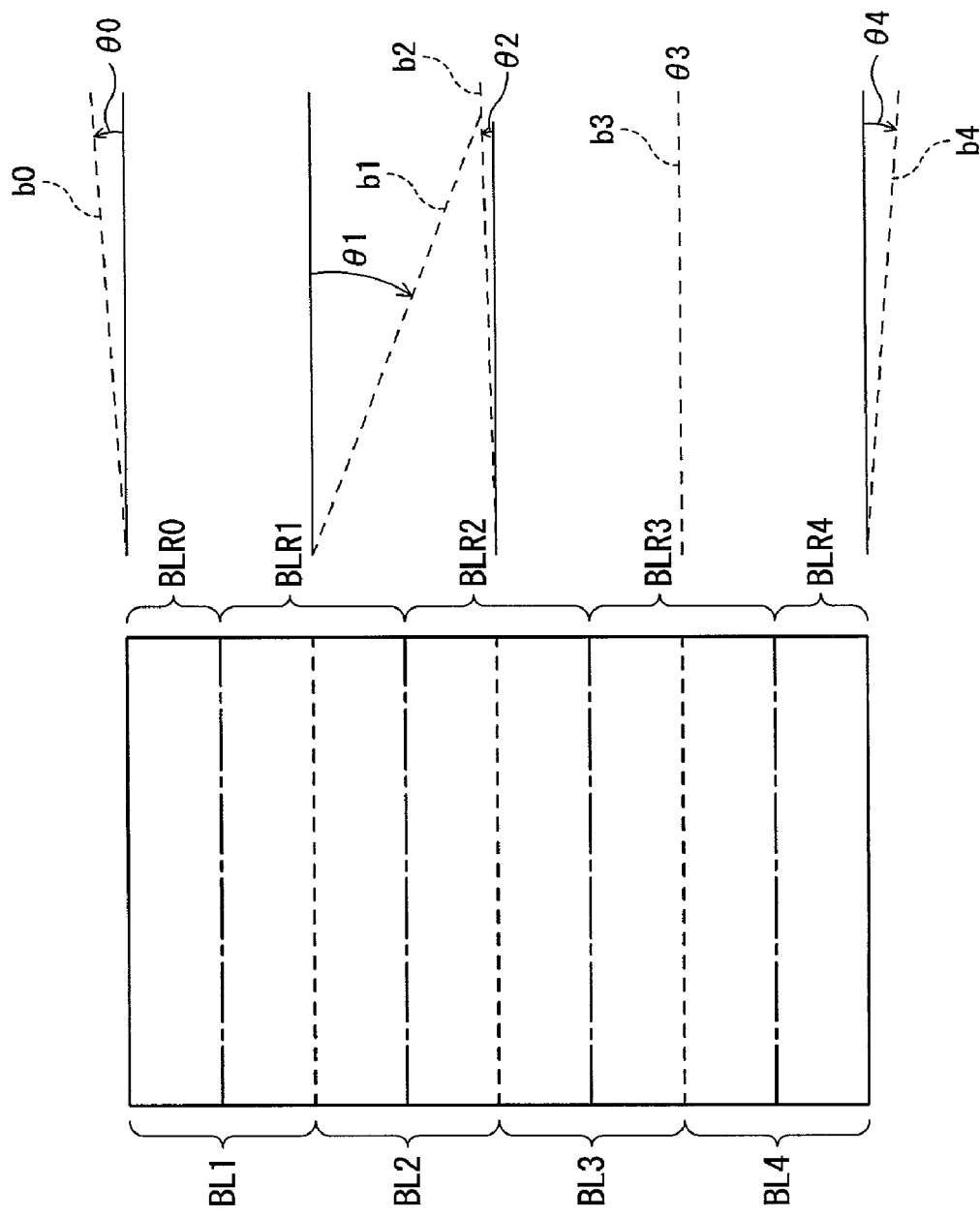
FIG. 21 is a schematic view illustrating an example of a boundary whose inclination is estimated in error by the image processing apparatus of FIG. 18.
Figure 22:
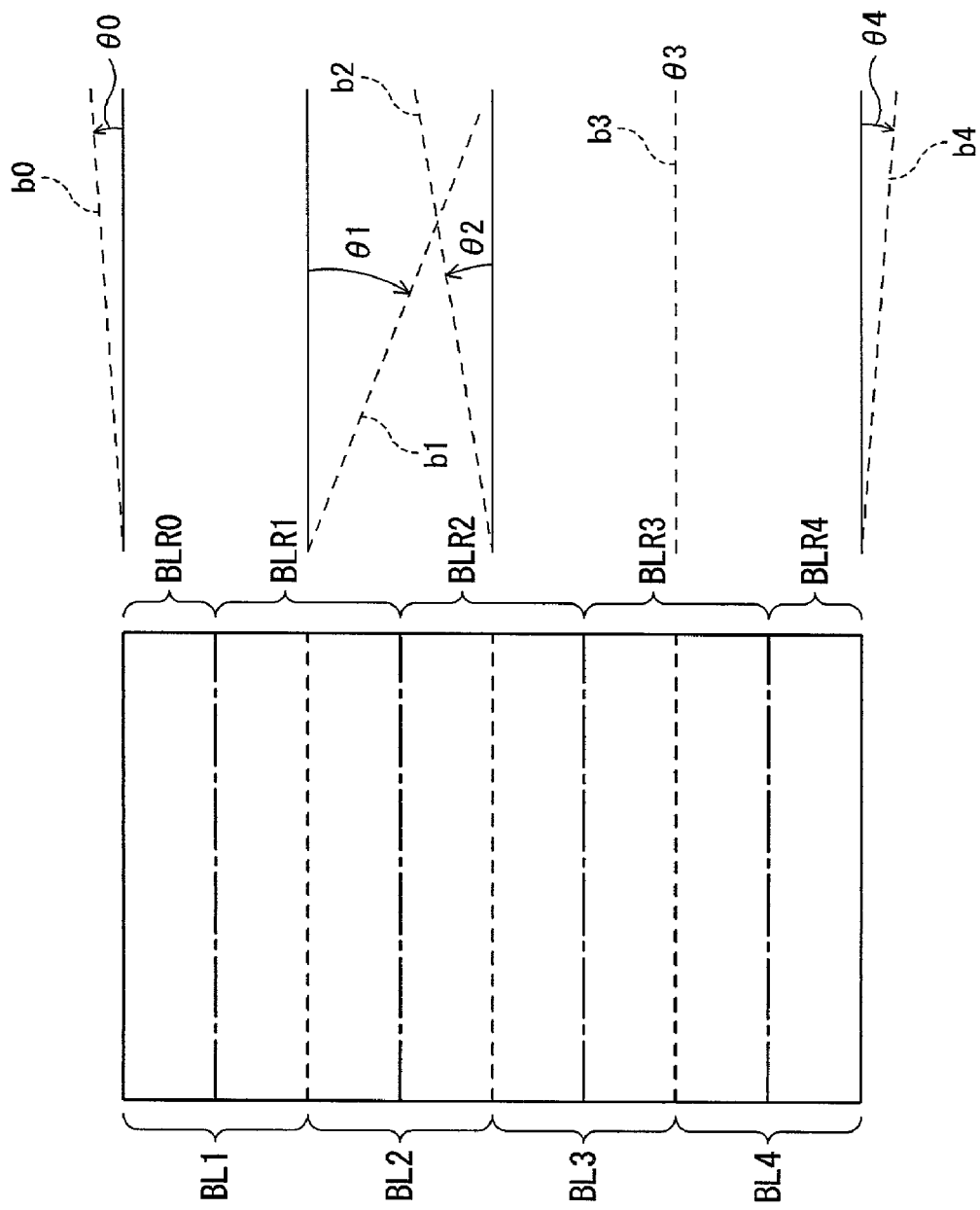
FIG. 22 is a similar view but illustrating another example of a boundary whose inclination is estimated in error by the image processing apparatus of FIG. 18.

Now, operation of the image processing apparatus 100C of the fourth embodiment described above is described with reference to FIGS. 19 to 27. FIG. 19 illustrates an image processing procedure of the image processing apparatus of the fourth embodiment; FIG. 20 illustrates a technique for estimating inclinations of an image (inclinations of the boundaries) of the opposite upper and lower sides of a block; FIGS. 21 and 22 illustrate different examples of a boundary whose inclination is estimated in error; FIG. 23 illustrates an example of selection of control points of a Bezier curve; FIG. 24 illustrates a connection state (connection states at the left and right ends of a boundary) between blocks after reconfiguration; and FIGS. 25 to 27 illustrate an image processing technique of the image processing apparatus of the fourth embodiment.

Figure 25:
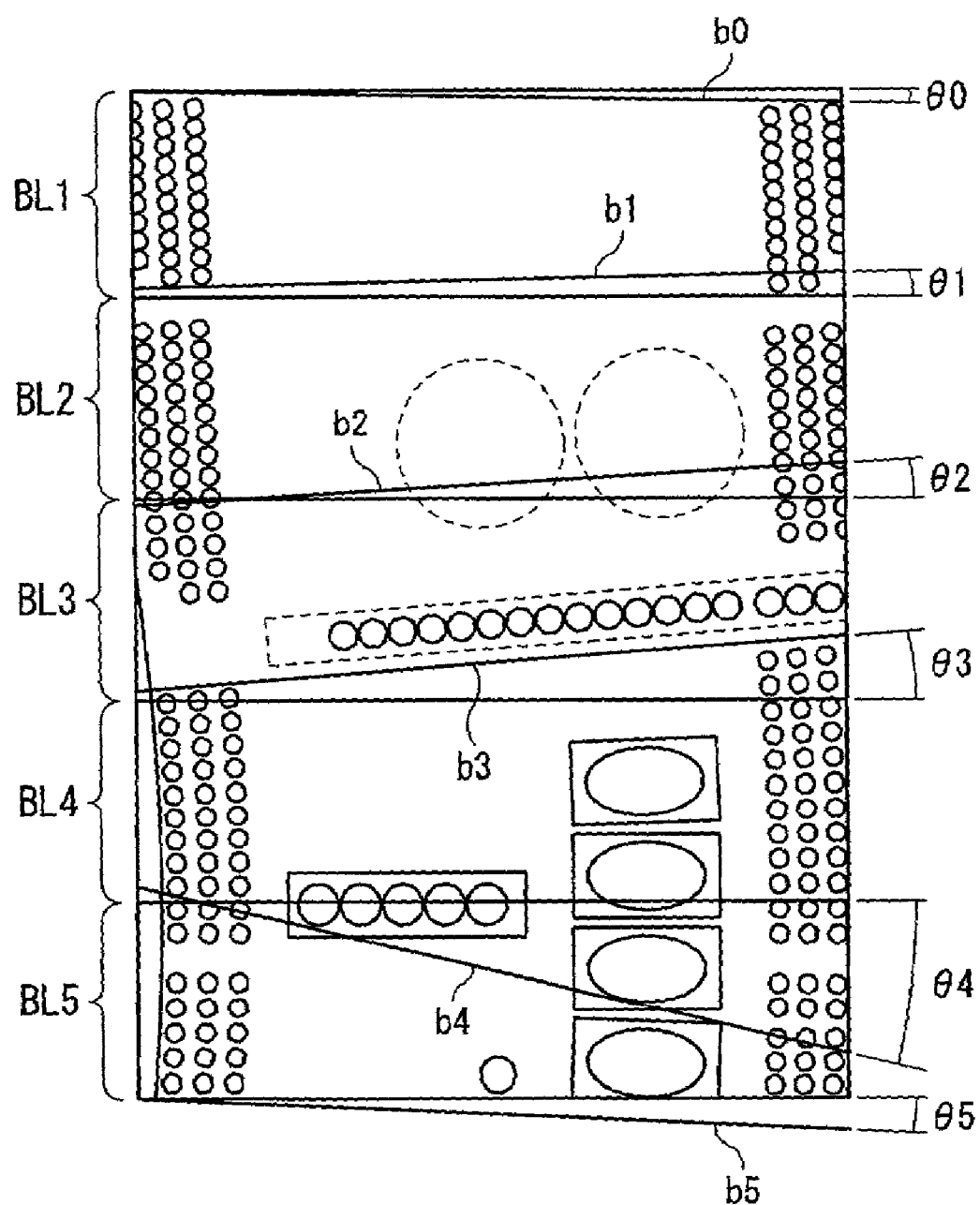
Figure 26:
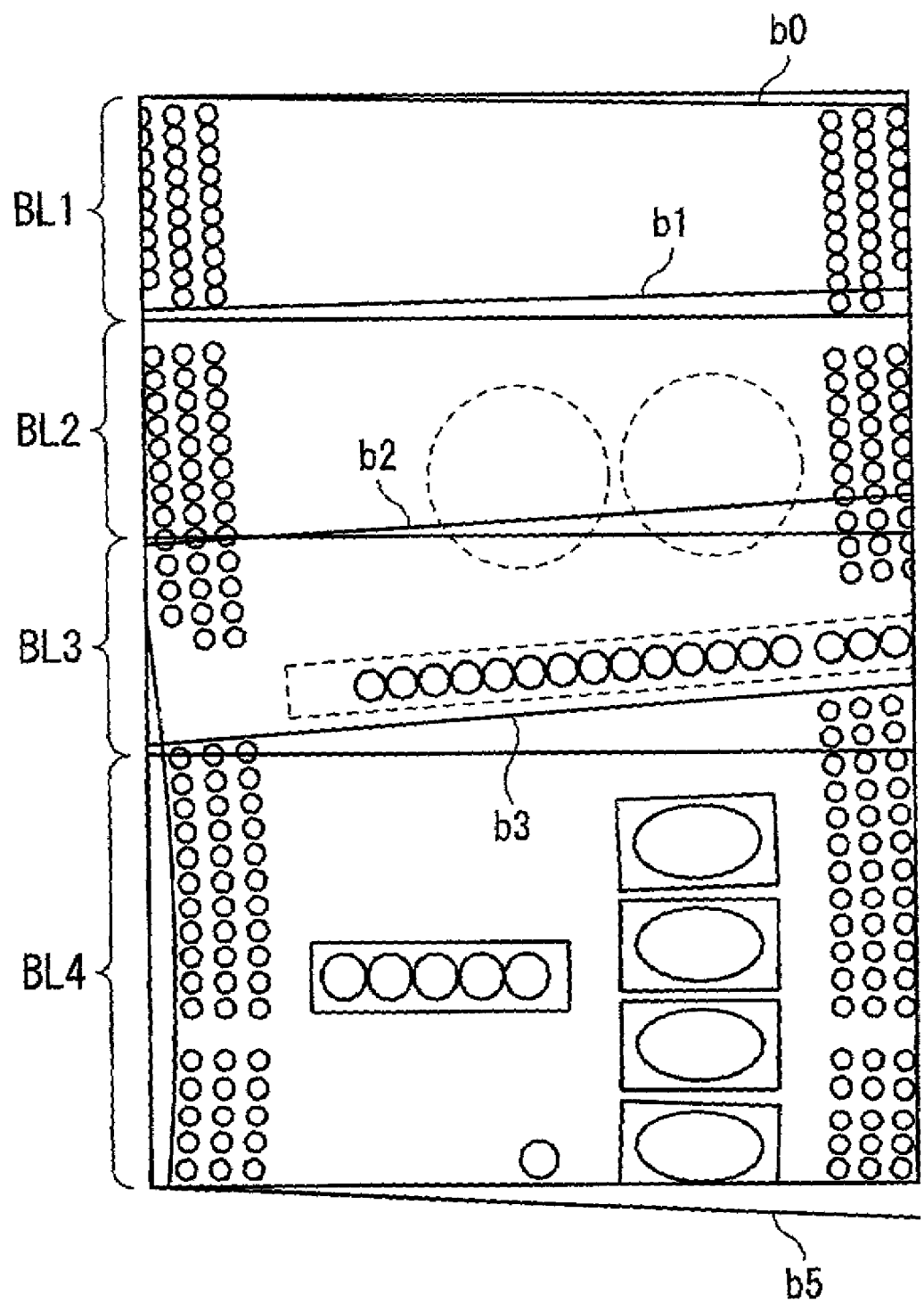

As operation of the image processing apparatus 100C of the fourth embodiment, operation when the image data (original image) obtained by such a handheld image scanner 10 as shown in FIG. 16 and stored in the image buffer 101 are data of, for example, such a document image (image of a newspaper of vertically written Japanese) as shown in FIG. 25 or 26 and the image processing apparatus 100C performs a correction process for the document image is described. The image processing apparatus 100C of the fourth embodiment can correct such a document image which suffers from two-dimensional distortion as shown in FIG. 25 or 26. The two-dimensional distortion illustrated in FIG. 25 or 26 is caused by such a movement of the image scanner 10 that, for example, when the image scanner 10 is operated for scanning, it slips and thus moves in a meandering fashion with respect to an original of a reading object. It is to be noted that, in FIGS. 25 to 27, each "○" represents a character. Further, in FIGS. 25 to 27, of small characters other than those of a caption (that is, characters representative of a newspaper article), those in three lines on the opposite left and right sides are represented each by "○" while indication of the other small characters is omitted.

An image processing procedure in the fourth embodiment is described with reference to a flow chart (steps S31 to S41) shown in FIG. 19.

In the fourth embodiment, a predetermined document image is first read, for example, by such a handheld image scanner 10 as shown in FIG. 16, and the image data thus read are stored into the image buffer 101 (step S31). It is assumed here that, during such reading, the image scanner 10 moves in a meandering fashion by a scanning operation of the operator and, for example, such image data (document image) as seen in FIG. 25 are obtained by the scanning.

Then, the block division section 118 divides the image data stored in the image buffer 101 into a plurality of blocks in the sub scanning direction (upward and downward direction) based on division information (division number) designated in advance (step S32; division step). In the example illustrated in FIG. 20, an example wherein "4" is designated as the division number is illustrated, and the image data are divided into four blocks BL1 to BL4 which are uniform in the sub scanning direction. It is to be noted that, in FIG. 25, another example wherein "5" is designated as the division number is illustrated, and the division data are divided into five blocks BL1 to BL5 which are uniform in the sub scanning direction.

Thereafter, the inclination estimation section 119 estimates inclinations of the image on the opposite upper and lower sides of the blocks BLi (i=1 to 4 or 1 to 5) obtained by the division by the block division section 118 and stores the estimated inclinations into the inclination list 120 (step S33; inclination estimation step). Thereupon, similarly as in the third embodiment, the inclination estimation section 119 detects inclinations of the image on the opposite upper and lower sides of each of the blocks BLi based on the inclinations of character trains which form the document image using the technique disclosed in Japanese Patent Laid-Open No. 341259/1999, that is, in accordance with the method described hereinabove with reference to FIGS. 10, 15A and 15B.

More particularly, as seen in FIGS. 20 to 22 or FIG. 25, the inclination of the upper side of the uppermost block BL1 is estimated as an inclination $\theta 0$ of a boundary b0 of the uppermost portion based on an inclination of a character train (image data) present in an upper half area BLR0 of the block BL1.

On the other hand, the inclination of the image on the lower side of the block BL1 is estimated as an inclination $\theta 1$ of the boundary b1 between the block BL1 and the block BL2 based on the inclination of a character train (image data) present in an area BLR1 composed of a lower half of the block BL1 and an upper half of the block BL2.

The inclination $\theta 1$ of the boundary b1 estimated in this manner is adopted also as an inclination of the image on the upper side of the block BL2. Thereafter, the inclinations of the image on the opposite upper and lower sides of each of the blocks BL2, BL3, BL4 and BL5 are estimated as an inclination $\theta 2$ to $\theta 5$ of the boundary b2, b3, b4 or b5.

It is to be noted that the inclination of the image on the lower side of the lowermost BL4 or BL5 is estimated as the inclination $\theta 4$ or $\theta 5$ of the boundary b4 or b5 of the lowermost portion based on the inclination of a character train (image data) present in a lower half area BLR4 or BLR5 of the block BL4 or BL5.

Thereafter, the detection section 121 detects any boundary whose inclination is estimated in error as an object boundary of abandonment based on the inclinations $\theta 0$ to $\theta 5$ of the boundaries b0 to b5 stored in the inclination list 120 (step S34). The boundary of an object of abandonment is a boundary which forms an angle greater than a predetermined angle with respect to another directly neighboring boundary or a boundary which intersects with another boundary within the image area.

In the example illustrated in FIG. 21, it is discriminated that the boundary b1 forms an angle greater than the predetermined angle with respect to the inclination angle of another directly neighboring boundary b0, and the boundary b1 becomes an object of abandonment. Meanwhile, in the example illustrated in FIG. 25, it is discriminated that the boundary b4 forms an angle greater than the predetermined angle with respect to another immediately neighboring boundary b3, and the boundary b4 becomes an object of abandonment. Furthermore, in the example illustrated in FIG. 22, it is discriminated that the boundary b1 intersects with another boundary b2 within the image area, and the boundary b1 becomes an object of abandonment.

After a boundary of an object of abandonment is detected by the detection section 121 in such a manner as described above, the boundary abandonment section 122 synthesizes two blocks on the opposite sides of each boundary of an object of abandonment into a single block. Thereupon, the boundary abandonment section 122 deletes and abandons information regarding the boundary of an object of abandonment (such as identification information, an inclination and so forth of the boundary) from the inclination list 120 thereby to synthesize the two blocks on the opposite sides of the boundary of an object of abandonment into a single block (step S35).

In the example illustrated in FIG. 21 or 22, information regarding the boundary b1 is deleted and abandoned from the inclination list 120 so that the blocks BL1 and BL2 are integrated with each other, and the thus integrated block is treated, for example, as the block BL1. In the example illustrated in FIG. 25 or 26, information regarding the boundary b4 is deleted and abandoned from the inclination list 120 so that the blocks BL4 and BL5 are integrated with each other, and the thus integrated block is treated, for example, as the block BL4.

Thereafter, an parameter i is set to its initial value "1" (step S36), and then the displacement amount estimation means 200 estimates the displacement amounts of the left and the right of the block BLi (step S37; displacement amount estimation step). Thereupon, the displacement amount estimation means 200 applies the displacement amount estimation (refer to FIG. 3) described hereinabove in connection with the first embodiment to each of the left and right side areas W1 and W2 (part data; refer to FIG. 9) of the block BLi extracted by the left and right area extraction section 114. Consequently, the displacement amounts of the opposite left and right sides of the line image data which form the block BLi are estimated for lines spaced by the predetermined distance d in the sub scanning direction, and such estimation results R1 and R2 are stored into the displacement amount memory 110.

It is to be noted that, also in the fourth embodiment, the displacement amounts of the opposite left and right sides stored in the displacement amount memory 110 are displacement amounts between lines spaced by a predetermined distance from each other and each has one of the values of "−1", "0" and "1" as described hereinabove. The displacement amount estimation results R1 and R2 are obtained by successively integrating displacement amounts of the left and right sides in the main scanning direction stored in the displacement amount memory 110 to determine a displacement amount with respect to the original image (i.e., to determine a movement of the image scanner 10) and illustrating results of such integration in a corresponding relationship to the positions in the sub scanning direction similarly as in the case of FIG. 6A.

Then, the smoothing processing section 113 performs a smoothing process using a Bezier curve for the estimation results R1 and R2 of the displacement amount obtained in such a manner as described above with regard to the block BLi and approximates the movements of the opposite ends of the image scanner 10 (line sensor 11) with Bezier curves (step S38; smoothing step).

A Bezier curve is represented generally by the expression (4) given hereinabove as described in connection with the third embodiment. Here, the vector constants A, B, C and D of the Bezier curve BZ1 with which the estimation result R1 of the left side of the block BLi is approximated are denoted by A1, B1, C1 and D1, respectively, and the vector constants A, B, C and D of the Bezier curve BZ2 with which the estimation result R2 of the right side of the block BLi is approximated are denoted by A2, B2, C2 and D2, respectively. Further, as seen in FIG. 23, the vector constants A1 and A2 are given as vectors representative of two upper side apexes of the block BLi, and the vectors D1 and D2 are given as vectors representative of lower side apexes of the block BLi (lowermost points of the estimation results R1 and R2, respectively).

In order to determine the Bezier curves, it is necessary to determine two control points B (B1 and B2) and C (C1 and C2) between the vectors A (A1 and A2) and D (D1 and D2). Thereupon, in the smoothing process in the fourth embodiment, the control points B (B1 and B2) and C (C1 and C2) are determined taking the inclinations of the opposite upper and lower sides estimated by the inclination estimation section 119, that is, the inclinations $\theta i-1$ and $\theta i$ of the boundaries bi−1 and bi, into consideration as shown in FIG. 23.

In FIG. 23, the distance in the sub scanning direction between the left side apexes A1 and D1 of the block BLi is represented by Li, the line in the sub scanning direction spaced by the distance Li/3 from the apex A1 by k1, and the line in the sub scanning direction spaced by the distance 2Li/3 from the apex A1 by k2. Similarly, the distance in the sub scanning direction between the right side apexes A2 and D2 of the block BLi is represented by Li', the line in the sub scanning direction spaced by the distance Li'/3 from the apex A2 by k1', and the line in the sub scanning direction spaced by the distance 2Li'/3 from the apex A2 by k2'. It is to be noted that W represents the reading width (fixed) of the image scanner 10 as described hereinabove. Further, although the control points B (B1 and B2) and C (C1 and C2) are set at the positions corresponding to ⅓ the distance L1 or L1' between apexes of the block BLi, according to the present invention, the control points are not limited to the specific ones.

Then, an intersecting point between a normal line to the boundary bi−1 passing the apex A1 and the line k1 in the sub scanning direction is determined as the control point B1, and an intersecting point between a normal line to the boundary bi passing the apex D1 and the line k2 in the sub scanning direction is determined as the control point C1. Similarly, an intersecting point between a normal line to the boundary bi−1 passing the apex A2 and the line k1' in the sub scanning direction is determined as the control point B2, and an intersecting point between a normal line to the boundary bi passing the apex D2 and the line k2' in the sub scanning direction is determined as the control point C2.

As the vector constants A, B, C and D are determined in such a manner as described above, the Bezier curves BZ1 and BZ2 with which the estimation results R1 and R2 are approximated are given by the above-given expression (4), and the displacement amounts on the opposite left and right sides are smoothed and the movements of the opposite left and right ends of the image scanner 10 are estimated. Consequently, an outer profile of the block BLi is determined.

Thereafter, the reconfiguration section 117 receives a result of the smoothing process by the smoothing processing section 113 for the block BLi and reconfigures the image data in the block BLi based on the inclinations θi−1 and θi of the boundaries bi−1 and bi of the opposite upper and lower sides using the parameter t of the Bezier curves (displacement amounts) of the opposite left and right sides obtained by the smoothing processing section 113. Consequently, any distortion of the image data in each block BLi is eliminated. Then, a result of the reconfiguration, that is, the image data in the blocks BLi after the correction, are written into the corrected image buffer 112 (step S39; reconfiguration step).

In this instance, as the control points B (B1 and B2) and C (C1 and C2) are set in such a manner as described hereinabove with reference to FIG. 23, the reconfiguration section 117 reconfigures, for each of the blocks BLi, the image data in the block BLi so that tangential lines in the sub scanning direction of the image areas at the upper side left and right ends A1 and A2 and the boundary bi−1 having the inclination θi−1 on the upper side estimated by the inclination estimation section 119 may intersect perpendicularly with each other and tangential lines in the sub scanning direction of the image areas at the lower side left and right ends D1 and D2 and the boundary bi having the inclination θi on the lower side estimated by the inclination estimation section 119 may intersect perpendicularly with each other.

Then, it is discriminated whether or not the parameter i is equal to the division umber (4 or 5 here) (step S40). If the parameter i is equal to the division number (YES route), then the processing is ended. On the other hand, if the parameter i is not equal to the division number (NO route), then the parameter i is incremented by 1 (step S41), whereafter the processing returns to step S37. It is to be noted that, if the parameter i corresponds to a boundary which has been abandoned by the boundary abandonment section 122, then the processes in steps S37 to S39 are omitted and the processing advances directly to step S40.

Since such a sequence of processes as described above are repeated, for example, the image data which have been taken by the image scanner 10 and divided into five blocks as illustrated in FIG. 25 and then integrated into the four blocks BL1 to BL4 by the boundary abandonment section 122 as seen in FIG. 26 are reconfigured for each of the blocks BLi (i=1 to 4) as seen in FIG. 27.

In this manner, with the image processing apparatus 100C of the fourth embodiment of the present invention, since image data are divided into a plurality of blocks BLi and reconfiguration of image data in the blocks BLi is performed for each of the blocks BLi, for example, even if the handheld image scanner 10 meandered upon reading of the image data by the image scanner 10, it is possible to use only the image data read by the image scanner 10 to correct two-dimensional distortion of the image data arising from the meandering without using a two-dimensional sensor. Consequently, image data of a high quality free from distortion can be obtained without giving rise to an increase of the production cost.

In this instance, the inclination of the image on the boundary bi−1 between two adjacent blocks BLi−1 and BLi is estimated as the inclination θi−1 of the boundary bi−1 based on the image data which are present on the opposite sides of the boundary bi−1, and the estimated inclination θi−1 is adopted as an estimation result of the inclination of the image on the lower side of the upper side block BLi-l and the inclination of the image on the upper side of the lower side block BLi. In other words, through estimation of the inclination θi−1 of the one boundary bi−1, the lower side inclination of the upper side block BLi−1 and the upper side inclination of the lower side block BLi can be estimated simultaneously. Further, since the lower side inclination of the upper side block BLi−1 and the upper side inclination of the lower side block BLi are not estimated separately from each other but estimated as the common inclination and therefore have an equal inclination, the blocks BLi−1 and BLi after the reconfiguration are connected with certainty to each other without a gap left therebetween in the sub scanning direction.

Since the boundary abandonment section 122 is used to discriminate that the inclination of a boundary having an angle greater than a predetermined angle with respect to another directly neighboring boundary or a boundary which intersects with another boundary in an image area has been estimated in error and integrate two blocks on the opposite sides of the erroneous boundary into a single block thereby to abandon any boundary whose inclination has been estimated in error, image reconfiguration which may be performed based on such an erroneous inclination can be prevented. Consequently, image reconfiguration having little error can be achieved.

On the other hand, if a result of estimation indicates that the lower side inclination of the upper side block BLi-l and the upper side inclination of the lower side block BLi have an equal inclination, then the image data in each of the blocks BLi are reconfigured so that tangential lines in the sub scanning direction of the image area at the left and right ends of the opposite upper and lower sides and the inclinations on the opposite upper and lower sides may intersect perpendicularly with each other. Consequently, when blocks after the reconfiguration are connected to each other, the tangential lines in the sub scanning direction of the image area at the left and right ends of the boundary become smooth, and image data of a higher picture quality can be obtained.

In this instance, since line image data are successively extracted in a spaced relationship from each other by a suitable distance (5 to 20 lines) d in the sub scanning direction from the image data in the left side image data area and the right side image data area and displacement amounts on the left side and the right side are estimated based on a cross-correlation between the extracted line image data similarly as in the first embodiment, the amount of calculation for estimating displacement amounts in the main scanning direction can be reduced. Consequently, an image correction process can be performed efficiently and simultaneously the accuracy in calculation of the displacement amount in the main scanning direction can be improved.

Further, also in the fourth embodiment, since reconfiguration of an image is performed after a smoothing process is performed for displacement amounts in the main scanning direction, a sharp displacement of image data which arises from a sharp movement of the image scanner 10 can be eliminated appropriately similarly as in the third embodiment. Consequently, image data of a higher picture quality can be obtained. Besides, since a Bezier curve [refer to the expression (4) given hereinabove] is used for the smoothing process in this instance, the reconfiguration of image data can be performed readily using the parameter t of the Bezier curve.

Furthermore, also in the fourth embodiment, the inclination angles θi−1 and θi of the image on the opposite upper and lower sides of each of the blocks BLi can be determined readily based on inclinations of character trains which form the document image of the image data similarly as in the third embodiment.

[5] Others

It is to be noted that the present invention is not limited to the embodiments specifically described above, and variations and modifications can be made without departing from the scope of the present invention.

For example, while, in the embodiments described above, the image data of an object of processing represent a document image, the present invention is not limited to this and can correct any data so that distortion of the image data may be eliminated in such a manner as described hereinabove only if the image data include data of ruled lines, a graph or an image with a framework.

Further, while, in the embodiments described above, image data obtained by the handheld image scanner 10 are processed, the present invention is not limited to this, but can be applied also to image data which suffer from some distortion by some reason. Also in this instance, similar effects to those can be anticipated.

Furthermore, the image processing according to the present invention may be performed otherwise such that inclinations of an image of upper and lower areas are detected from image data of an object of processing by the inclination detection section 116 and, if there is no difference between the upper and lower inclinations, then such processing as described above in connection with the first or second embodiment is performed, but if there is some difference between the upper and lower inclinations, then such processing as described above in connection with the third embodiment is performed.

Further, while, in the embodiment described above, the division number of image data is 4 or 5, the present invention is not limited to the specific division number.

What is claimed is:

1. An image processing apparatus for performing a process for image data including a plurality of rows of line image data extending along a main scanning direction defined as a leftward and a rightward direction expediently, and arranged in a sub scanning direction defined as an upward and a downward direction expediently, comprising:

estimation means for successively extracting line image data for one row from the image data and estimating a displacement amount in the main scanning direction between the line image data based on a cross-correlation between the extracted line image data; and correction means for correcting the image data so as to cancel a displacement in the main scanning direction in the image data based on the displacement amount in the main scanning direction estimated by said estimation means.

2. The image processing apparatus as claimed in claim 1, wherein said estimation means successively extracts the line image data in a suitably spaced relationship from each other in the sub scanning direction and estimates the displacement amount in the main scanning direction based on a cross-correlation between the line image data spaced from each other.

3. The image processing apparatus as claimed in claim 2, wherein the space corresponds to 5 to 20 lines.

4. The image processing apparatus as claimed in claim 2, wherein said correction means determines displacement amounts of the individual line image data which exist between the line image data spaced from each other by performing linear interpolation based on the displacement amounts of the main scanning direction and corrects the image data based on a result of the linear interpolation.

5. The image processing apparatus as claimed in claim 3, wherein said correction means determines displacement amounts of the individual line image data which exist between the line image data spaced from each other by performing linear interpolation based on the displacement amounts of the main scanning direction and corrects the image data based on a result of the linear interpolation.

6. The image processing apparatus as claimed in claim 4, further comprising smoothing means for performing a smoothing process for the displacement amounts in the main scanning direction so that the displacement amounts in the main scanning direction estimated with the space by said estimation means may vary along a smooth curve, and wherein said correction means performs the linear interpolation based on the displacement amount in the main scanning direction smoothed by said smoothing means.

7. The image processing apparatus as claimed in claim 5, further comprising smoothing means for performing a smoothing process for the displacement amounts in the main scanning direction so that the displacement amounts in the main scanning direction estimated with the space by said estimation means may vary along a smooth curve, and wherein said correction means performs the linear interpolation based on the displacement amount in the main scanning direction smoothed by said smoothing means.

8. An image processing method for performing a process for image data which are a plurality of rows of line image data extending along a main scanning direction defined as a leftward and a rightward direction expediently, and arranged in a sub scanning direction defined as an upward and a downward direction expediently, comprising:

successively extracting line image data for one row from the image data and estimating a displacement amount in the main scanning direction between the line image data based on a cross-correlation between the extracted line image data; and correcting the image data so as to cancel a displacement in the main scanning direction in the image data based on the displacement amount in the main scanning direction estimated by the estimation step.

9. A computer-readable recording medium on which an image processing program which causes a computer to execute an image processing function for performing a process for image data including a plurality of rows of line image data extending along a main scanning direction defined as a leftward and a rightward direction expediently, and arranged in a sub scanning direction defined as an upward and a downward direction expediently, is recorded, the image processing program causing a computer to function as:

successively extracting line image data for one row from the image data and estimating a displacement amount in the main scanning direction between the line image data based on a cross-correlation between the extracted line image data; and correcting the image data so as to cancel a displacement in the main scanning direction in the image data based on the displacement amounts in the main scanning direction estimated by said estimation means.

10. An image processing apparatus for performing a process for image data which are a plurality of rows of line image data extending along a main scanning direction defined as a leftward and rightward direction expediently, and arranged in a sub scanning direction defined as an upward and downward direction expediently, comprising:

estimation means for estimating, based on a cross-correlation between part data which form the plurality of rows of line image data, displacement amounts in the main scanning direction on the left side and the right side of the image data;

detection means for detecting inclinations of an image on the opposite upper and lower sides of the image data based on the image data; and reconfiguration means for reconfiguring the image data based on the displacement amounts in the main scanning direction estimated by said estimation means and the inclinations detected by said detection means to cancel a distortion of the image data.

11. The image processing apparatus as claimed in claim 10, wherein said estimation means successively extracts the line image data in a suitably spaced relationship in the sub scanning direction from an image data area on the left side and an image data area on the right side and estimates displacement amounts in the main scanning direction on the left side and the right side based on a cross-correlation between the line image data spaced from each other.

12. The image processing apparatus as claimed in claim 11, wherein the space corresponds 5 to 20 lines.

13. The image processing apparatus as claimed in claim 11, further comprising smoothing means for performing a smoothing process for the displacement amounts in the main scanning direction estimated with the space so that the displacement amounts in the main scanning direction may vary along a smooth curve, and wherein said reconfiguration means performs reconfiguration of the image based on the curve obtained by said smoothing means.

14. The image processing apparatus as claimed in claim 12, further comprising smoothing means for performing a smoothing process for the displacement amounts in the main scanning direction estimated with the space so that the displacement amounts in the main scanning direction may vary along a smooth curve, and wherein said reconfiguration means performs reconfiguration of the image based on the curve obtained by said smoothing means.

15. The image processing apparatus as claimed in claim 13, wherein a Bezier curve is used for the smoothing process, and said reconfiguration means performs the reconfiguration of the image data using a parameter of the Bezier curve.

16. The image processing apparatus as claimed in claim 14, wherein a Bezier curve is used for the smoothing process, and said reconfiguration means performs the reconfiguration of the image data using a parameter of the Bezier curve.

17. The image processing apparatus as claimed in claim 10, wherein image data relates to a document image, and said detection means detects an inclination of the image based on an inclination of character lines which form the document image.

18. The image processing apparatus as claimed in claim 11, wherein image data relates to a document image, and said detection means detects an inclination of the image based on an inclination of character lines which form the document image.

19. The image processing apparatus as claimed in claim 12, wherein image data relates to a document image, and said detection means detects an inclination of the image based on an inclination of character lines which form the document image.

20. The image processing apparatus as claimed in claim 13, wherein image data relates to a document image, and said detection means detects an inclination of the image based on an inclination of character lines which form the document image.

21. The image processing apparatus as claimed in claim 14, wherein image data relates to a document image, and said detection means detects an inclination of the image based on an inclination of character lines which form the document image.

22. The image processing apparatus as claimed in claim 15, wherein image data relates to a document image, and said detection means detects an inclination of the image based on an inclination of character lines which form the document image.

23. The image processing apparatus as claimed in claim 16, wherein image data relates to a document image, and said detection means detects an inclination of the image based on an inclination of character lines which form the document image.

24. An image processing method for performing a process for image data which are a plurality of rows of line image data extending along a main scanning direction defined as a leftward and rightward direction expediently, and arranged in a sub scanning direction defined as an upward and downward direction expediently, comprising:

an estimation step of estimating, based on a cross-correlation between part data which form the plurality of rows of line image data, displacement amounts in the main scanning direction on the left side and the right side of the image data;

a detection step of detecting inclinations of an image on the opposite upper and lower sides of the image data based on the image data; and a reconfiguration step of reconfiguring the image data based on the displacement amounts of the main scanning direction estimated by the estimation step and the inclinations detected by the detection step to cancel a distortion of the image data.

25. A computer-readable recording medium on which an image processing program which causes a computer to execute an image processing function for performing a process for image data which are a plurality of rows of line image data extending along a main scanning direction defined as a leftward and rightward direction expediently, and arranged in a sub scanning direction defined as an upward and downward direction expediently, is recorded, the image processing program causing a computer to function as:

estimation means for estimating displacement amounts in the main scanning direction on the left side and the right side of the image data based on a cross-correlation between part data which form a plurality of rows of line image data;

detection means for detecting inclinations of an image on the opposite upper and lower sides of the image data based on the image data; and reconfiguration means for reconfiguring the image data based on the displacement amounts in the main scanning direction estimated by said estimation means and the inclinations detected by said detection means to cancel a distortion of the image data.

26. An image processing apparatus for performing a process for image data are a plurality of rows of line image data extending along a main scanning direction defined as a leftward and rightward direction expediently, and arranged in a sub scanning direction defined as an upward and downward direction expediently, comprising:

division means for dividing the image data into a plurality of blocks in the sub scanning direction;

inclination estimation means for estimating inclinations of an image on the opposite upper and lower sides of each of the blocks obtained by the division by said division means;

displacement amount estimation means for estimating displacement amounts in the main scanning direction on the left side and the right side of each of the blocks based on a cross-correlation between part data which form line image data in the block; and reconfiguration means for reconfiguring, for each of the blocks, the image data in the block based on the displacement amounts in the main scanning direction estimated by said displacement amount estimation means and the inclinations of the image on the opposite upper and lower sides of the block estimated by said inclination estimation means to cancel a distortion of the image data in the block.

27. The image processing apparatus as claimed in claim 26, wherein said inclination estimation means estimates an inclination of the image on a boundary between two adjacent ones of the plurality of blocks as an inclination of the boundary based on the image data which exist across the boundary and applies the estimated inclination of the boundary as an inclination of the image on the lower side of the upper side block of the two blocks and an inclination of the image on the upper side of the lower side block of the two blocks.

28. The image processing apparatus as claimed in claim 27, further comprising:

detection means for detecting, from among a plurality of boundaries estimated by said inclination estimation means, a boundary which defines an angle equal to or greater than a predetermined angle with respect to another proximate boundary based on the inclinations of the boundaries; and block integration means for integrating two blocks on the opposite sides of the boundary detected by said detection means into one block; and wherein said displacement amount estimation means and said reconfiguration means execute the estimation process and the reconfiguration process, respectively, based on the block integrated by said block integration means.

29. The image processing apparatus as claimed in claim 27, further comprising:

detection means for detecting, from among a plurality of boundaries estimated by said estimation means, a boundary which intersects another boundary in an image area based on the inclinations of the boundaries; and block integration means for integrating two blocks on the opposite sides of the boundary detected by said detection means into one block; and wherein said displacement amount estimation means and said reconfiguration means execute the estimation process and the reconfiguration process, respectively, based on the block integrated by said block integration means.

30. The image processing apparatus as claimed in claim 27, wherein said reconfiguration means reconfigures, for each of the blocks, image data in the block so that tangential lines in the sub scanning direction to the image area at the opposite left and right ends on the opposite upper and lower sides and the inclinations on the opposite upper and lower sides estimated by said inclination estimation means may be orthogonal to each other.

31. The image processing apparatus as claimed in claim 28, wherein said reconfiguration means reconfigures, for each of the blocks, image data in the block so that tangential lines in the sub scanning direction to the image area at the opposite left and right ends on the opposite upper and lower sides and the inclinations on the opposite upper and lower sides estimated by said inclination estimation means may be orthogonal to each other.

32. The image processing apparatus as claimed in claim 29, wherein said reconfiguration means reconfigures, for each of the blocks, image data in the block so that tangential lines in the sub scanning direction to the image area at the opposite left and right ends on the opposite upper and lower sides and the inclinations on the opposite upper and lower sides estimated by said inclination estimation means may be orthogonal to each other.

33. The image processing apparatus as claimed in claim 26, wherein the image data relate to a document image, and said inclination estimation means detects an inclination of the image based on an inclination of character lines which form the document image.

34. The image processing apparatus as claimed in claim 27, wherein the image data relate to a document image, and said inclination estimation means detects an inclination of the image based on an inclination of character lines which form the document image.

35. The image processing apparatus as claimed in claim 26, wherein said displacement amount estimation means successively extracts the line image data in a suitably spaced relationship in the sub scanning direction from an image data area on the left side and an image data area on the right side and estimates displacement amounts in the main scanning direction on the left side and the right side based on a cross-correlation of the line image data spaced from each other.

36. The image processing apparatus as claimed in claim 27, wherein said displacement amount estimation means successively extracts the line image data in a suitably spaced relationship in the sub scanning direction from an image data area on the left side and an image data area on the right side and estimates displacement amounts in the main scanning direction on the left side and the right side based on a cross-correlation of the line image data spaced from each other.

37. The image processing apparatus as claimed in claim 35, wherein the space corresponds to 5 to 20 lines.

38. The image processing apparatus as claimed in claim 36, wherein the space corresponds to 5 to 20 lines.

39. The image processing apparatus as claimed in claim 35, further comprising smoothing means for performing a smoothing process for the displacement amounts in the main scanning direction estimated with the space so that the displacement amounts may vary along a smooth curve, and wherein said reconfiguration means executes the reconfiguration of the image data in the blocks based on the curve obtained by said smoothing means.

40. The image processing apparatus as claimed in claim 36, further comprising smoothing means for performing a smoothing process for the displacement amounts in the main scanning direction estimated with the space so that the displacement amounts may vary along a smooth curve, and wherein said reconfiguration means executes the reconfiguration of the image data in the blocks based on the curve obtained by said smoothing means.

41. The image processing apparatus as claimed in claim 37, further comprising smoothing means for performing a smoothing process for the displacement amounts in the main scanning direction estimated with the space so that the displacement amounts may vary along a smooth curve, and wherein said reconfiguration means executes the reconfiguration of the image data in the blocks based on the curve obtained by said smoothing means.

42. The image processing apparatus as claimed in claim 38, further comprising smoothing means for performing a smoothing process for the displacement amounts in the main scanning direction estimated with the space so that the displacement amounts may extend along a smooth curve, and wherein said reconfiguration means executes the reconfiguration of the image data in the blocks based on the curve obtained by said smoothing means.

43. The image processing apparatus as claimed in claim 41, wherein a Bezier curve is used for the smoothing process, and said reconfiguration means performs the reconfiguration of the image data in the blocks using a parameter of the Bezier curve.

44. The image processing apparatus as claimed in claim 42, Wherein a Bezier curve is used for the smoothing process, and said reconfiguration means performs reconfiguration of the image data in the blocks using a parameter of the Bezier curve.

45. An image processing method for performing a process for image data which are a plurality of rows of line image data extending along a main scanning direction defined as a leftward and rightward direction expediently, and arranged in a sub scanning direction defined as an upward and downward direction expediently, comprising:
  a division step of dividing the image data into a plurality of blocks in the sub scanning direction;
  an inclination estimation step of estimating inclinations of an image on the opposite upper and lower sides of each of the blocks obtained by the division by said division step;
  a displacement amount estimation step of estimating displacement amounts in the main scanning direction on the left side and the right side of each of the blocks based on a cross-correlation between part data which form line image data in the blocks; and
  a reconfiguration step of reconfiguring, for each of the blocks, the image data in the block based on the displacement amounts in the main scanning direction estimated by the displacement amount estimation step and the inclinations on the opposite upper and lower sides of the block estimated by the inclination estimation step to cancel a distortion of the image data in the block.

46. A computer-readable recording medium on which an image processing program which causes a computer to execute an image processing function for performing a process for image data which are a plurality of rows of line image data extending along a main scanning direction defined as a leftward and rightward direction expediently, and arranged in a sub scanning direction defined as an upward and downward direction expediently, is recorded, the image processing program causing a computer to function as:
  division means for dividing the image data into a plurality of blocks in the sub scanning direction;
  inclination estimation means for estimating inclinations of an image on the opposite upper and lower sides of each of the blocks obtained by the division by said division means;
  displacement amount estimation means for estimating displacement amounts of the main scanning direction on the left side and the right side of the blocks based on a cross-correlation between part data which form line image data in the blocks; and
  reconfiguration means for reconfiguring, for each of the blocks, image data in the block based on the displacement amounts of the main scanning direction estimated by said displacement amount estimation means and the inclinations on the opposite upper and lower sides of the block estimated by said inclination estimation means to cancel a distortion of the image data in the block.

* * * * *